(12) United States Patent
Noh et al.

(10) Patent No.: US 11,844,147 B2
(45) Date of Patent: Dec. 12, 2023

(54) METHOD AND APPARATUS FOR RESOURCE ALLOCATION FOR NETWORK COORDINATION

(71) Applicant: Samsung Electronics Co., Ltd., Suwon-si (KR)

(72) Inventors: Hoondong Noh, Suwon-si (KR); Jinhyun Park, Suwon-si (KR); Heecheol Yang, Suwon-si (KR); Younsun Kim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 16/740,261

(22) Filed: Jan. 10, 2020

(65) Prior Publication Data

US 2020/0228970 A1    Jul. 16, 2020

(30) Foreign Application Priority Data

Jan. 10, 2019 (KR) .................. 10-2019-0003298
Feb. 1, 2019 (KR) .................. 10-2019-0013838
Aug. 28, 2019 (KR) .................. 10-2019-0106150

(51) Int. Cl.
*H04W 72/0446* (2023.01)
*H04W 72/23* (2023.01)
(Continued)

(52) U.S. Cl.
CPC .......... *H04W 8/245* (2013.01); *H04L 5/0092* (2013.01); *H04W 72/0446* (2013.01); *H04W 72/0453* (2013.01); *H04W 72/23* (2023.01)

(58) Field of Classification Search
CPC ............... H04W 8/245; H04W 72/042; H04W 72/0446; H04W 72/0453; H04W 48/12;
(Continued)

(56) References Cited

U.S. PATENT DOCUMENTS

| 8,427,978 B2 | 4/2013 | Xiao |
| 11,234,276 B2 | 1/2022 | Kung et al. |

(Continued)

FOREIGN PATENT DOCUMENTS

| EP | 3793250 A1 * | 3/2021 | .......... H04L 1/0068 |
| KR | 10-2018-0105555 A | 9/2018 | |
| WO | 2019017751 A1 | 1/2019 | |

OTHER PUBLICATIONS

International Search Report and Written Opinion of the International Searching Authority in connection with International Application No. PCT/KR2020/002116 dated May 29, 2020, 8 pages.

(Continued)

*Primary Examiner* — Jae Y Lee
*Assistant Examiner* — Aixa A Guadalupe Cruz

(57) ABSTRACT

The disclosure relates to a communication technique for fusing a 5th generation (5G) or pre-5G communication system with IoT technology to support higher data rates after a 4th generation (4G) communication system such as long term evolution (LTE) and a system thereof. The disclosure can be applied to intelligent services (e.g., smart home, smart building, smart city, smart car or connected car, healthcare, digital education, retail, security and safety related services, etc.) based on 5G communication technology and IoT-related technology. According to various embodiments of the disclosure, a method and apparatus for allocating time and frequency resources for smoothly providing a service are provided.

16 Claims, 18 Drawing Sheets

(51) Int. Cl.
*H04W 8/24* (2009.01)
*H04L 5/00* (2006.01)
*H04W 72/0453* (2023.01)

(58) Field of Classification Search
CPC ... H04W 8/24; H04W 72/044; H04W 72/048; H04L 5/0035; H04L 5/0007; H04L 5/0055; H04L 5/001; H04L 5/0053; H04L 5/0069; H04L 5/0044; H04L 5/0037; H04L 5/0091
See application file for complete search history.

(56) References Cited

U.S. PATENT DOCUMENTS

| | | | |
|---|---|---|---|
| 11,523,419 B2* | 12/2022 | Takeda | H04L 1/0009 |
| 2018/0048372 A1 | 2/2018 | Sun et al. | |
| 2018/0132227 A1 | 5/2018 | Ghosh et al. | |
| 2018/0270799 A1 | 9/2018 | Noh et al. | |
| 2018/0343653 A1 | 11/2018 | Guo | |
| 2020/0008231 A1* | 1/2020 | Vilaipornsawai | H04W 72/21 |
| 2020/0015200 A1* | 1/2020 | Vilaipornsawai | H04W 72/23 |
| 2020/0053757 A1* | 2/2020 | Bagheri | H04L 5/10 |
| 2020/0145274 A1 | 5/2020 | Nammi | |
| 2020/0221428 A1* | 7/2020 | Moon | H04B 7/024 |
| 2020/0221487 A1* | 7/2020 | Lee | H04L 5/0044 |
| 2020/0337058 A1* | 10/2020 | Song | H04W 72/0446 |
| 2021/0045142 A1 | 2/2021 | Joseph et al. | |
| 2021/0105785 A1 | 4/2021 | Manolakos et al. | |
| 2021/0112583 A1 | 4/2021 | Gao et al. | |
| 2021/0153188 A1* | 5/2021 | Wang | H04L 5/0051 |
| 2021/0204260 A1 | 7/2021 | Liu et al. | |
| 2021/0274538 A1 | 9/2021 | Liu et al. | |

OTHER PUBLICATIONS

Huawei et al., "Single PDCCH based multi-TRP/panel transmission," R1-1900848, 3GPP TSG RAN WG1 Ad-Hoc Meeting 1901, Taipei, Taiwan, Jan. 21-25, 2019, 6 pages.
VIVO, "Discussion on multi PDCCH based multi TRP transmission," R1-1900137, 3GPP TSG RAN WG1 Ad-Hoc Meeting 1901, Taipei, Taiwan, Jan. 21-25, 2019, 15 pages.
ZTE, "Enhancements on multi-TRP/Panel transmission," R1-1900087, 3GPP TSG RAN WG1 Ad-Hoc Meeting 1901, Taipei, Taiwan, Jan. 21-25, 2019, 16 pages.
AT&T, "Single and Multi DCI NC-JT Framework for Multi TRP Transmission in NR", 3GPP TSG RAN WG1 Meeting #88, Feb. 13-17, 2017, R1-1702259, 5 pages.
Samsung, "System level evaluation for non-fully overlapped NCJT", 3GPP TSG RAN WG1 Meeting #90, Aug. 21-25, 2017, R1-1714578, 5 pages.
NTT Docomo, Inc. (Rapporteur), "RAN WG's progress on NR WI in the January AH Meeting 2018, "3GPP TSG-RAN WG2 #101, Feb. 26-Mar. 2, 2018, R2-1801889, 110 pages.
Ericsson, "Multi-TRP Transmission", 3GPP TSG RAN WG1 Meeting #88, Feb. 13-17, 2017, R1-1702673, 5 pages.
International Search Report dated Apr. 21, 2020 in connection with International Patent Application No. PCT/KR2020/000485, 3 pages.
Written Opinion of the International Searching Authority dated Apr. 21, 2020 in connection with International Patent Application No. PCT/KR2020/000485, 5 pages.
European Search Report dated Dec. 8, 2021, in connection with European Patent Application No. 20738828.1, 14 pages.
Lenovo et al., "Discussion of multi-panel/multi-TRP transmission", 3GPP TSG RAN WG1 Meeting #95, R1-1812784, Spokane, USA, Nov. 12-16, 2018, 5 pages.
Nokia et al., "Enhancements for multi-TRP/panel transmission", 3GPP TSG RAN WG1 Meeting #94bis, R1-1811407, Chengdu, China, Oct. 8-12, 2018, 13 pages.
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), 475 pages.
Nokia, et al., "Enhancements on Multi-TRP/Panel Transmission", 3GPP TSG RAN WG1 Meeting #95, R1-1813489, Spokane, USA, Nov. 12-16, 2018, 18 pages.
Qualcomm Incorporated, "Multi-TRP Enhancements", 3GPP TSG-RAN WG1 Meeting #95, R1-1813442, Nov. 12-16, 2018, 20 pages.
Notice of Allowance dated Sep. 24, 2021, in connection with U.S. Appl. No. 16/791,364, 24 pages.
European Patent Office, "Supplementary European Search Report" dated Feb. 9, 2022, in connection with European Patent Application 20755070.8, 10 pages.
CATT, "Considerations on multi-TRP/panel transmissions" R1-1910349, 3GPP TSG RAN WG1 #98bis, Chongqing, China, Oct. 14-20, 2019, 25 pages.
Intellectual Property India, "Examination Report under sections 12 & 13 of the Patents Act," dated Mar. 9, 2023, in connection with Indian Patent Application No. 202137038906, 5 pages.
Non-Final Office Action dated Jul. 6, 2023, in connection with U.S. Appl. No. 17/559,359, 25 pages.

* cited by examiner

METHOD AND APPARATUS FOR RESOURCE ALLOCATION FOR NETWORK COORDINATION

CROSS-REFERENCE TO RELATED APPLICATIONS

This application is based on and claims priority under 35 U.S.C. 119 to Korean Patent Application No. 10-2019-0003298 filed on Jan. 10, 2019, Korean Patent Application No. 10-2019-0013838 filed on Feb. 1, 2019 and Korean Patent Application No. 10-2019-0106150 filed on Aug. 28, 2019 in the Korean Intellectual Property Office, the disclosures of which are herein incorporated by reference in their entirety.

BACKGROUND

1. Field

The disclosure relates to a wireless communication system and, more particularly, to a method and apparatus for allocating time and frequency resources for smoothly providing a service.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

In a 5G system, support for various services can be supported compared to the existing 4G system. For example, examples of the most representative services may include enhanced mobile broad band (eMBB), ultra-reliable and low latency communication (URLLC), massive machine type communication (mMTC), evolved multimedia broadcast/multicast service (eMBMS), and the like. In addition, a system providing the URLLC service may be referred to as a URLLC system and a system providing the eMBB service may be referred to as an eMBB system. In addition, the terms service and system may be used interchangeably.

Among these, the URLLC service is newly considered in the 5G system unlike the existing 4G system, and is required to satisfy ultra reliable (e.g., a packet error rate of about 10 to 5) and low latency (e.g., about 0.5 msec) requirements compared to other services. In order to satisfy these strict requirements, it is necessary to apply a shorter transmission time interval (TTI) than that of the eMBB service to the URLLC service, and various operation methods using the same are being considered.

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and apparatus for allocating time and frequency resources to smoothly provide a service in a wireless communication system.

The technical subjects pursued in the disclosure may not be limited to the above mentioned technical subjects, and other technical subjects which are not mentioned may be clearly understood, through the following descriptions, by those skilled in the art of the disclosure.

According to an embodiment of the disclosure, it is possible to efficiently allocate time and frequency resources in a wireless communication system.

Effects obtainable from the disclosure may not be limited to the above mentioned effects, and other effects which are not mentioned may be clearly understood, through the following descriptions, by those skilled in the art of the disclosure.

In accordance with an aspect of the disclosure, a method of a user equipment (UE) in a communication system comprising: transmitting, to a base station, capability information indicating whether a communication based on multiple transmission and reception points is available; receiving, from the base station, physical downlink shared channel (PDSCH) resource allocation information associated with the multiple transmission and reception points; and receiving at least one data in a PDSCH transmitted from the multiple transmission and reception points, based on the PDSCH resource allocation information, is provided.

In accordance with another aspect of the disclosure, a method of a base station in a communication system, the method comprising: receiving, from a user equipment (UE), capability information indicating whether a communication based on multiple transmission and reception points is available; transmitting, to the UE, physical downlink shared channel (PDSCH) resource allocation information associated with the multiple transmission and reception points; and transmitting, to the UE, at least one data in a PDSCH based on the PDSCH resource allocation information, is provided.

In accordance with another aspect of the disclosure, a user equipment (UE) comprising: a transceiver; and a controller configured to: transmit, to a base station via the transceiver, capability information indicating whether a communication based on multiple transmission and reception points is available; receive, from the base station via the transceiver, physical downlink shared channel (PDSCH) resource allocation information associated with the multiple transmission and reception points; and receive, at least one data in a PDSCH transmitted from the multiple transmission and reception points, based on the PDSCH resource allocation information, is provided.

In accordance with another aspect of the disclosure, a base station comprising: 16. A base station in a communication system, the base station comprising: a transceiver; a controller configured to: receive, from a user equipment (UE) via the transceiver, capability information indicating whether a communication based on multiple transmission and reception points is available; transmit, to the UE via the transceiver, physical downlink shared channel (PDSCH) resource allocation information associated with the multiple transmission and reception points; and transmit, to the UE via the transceiver, at least one data in a PDSCH based on the PDSCH resource allocation information, is provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
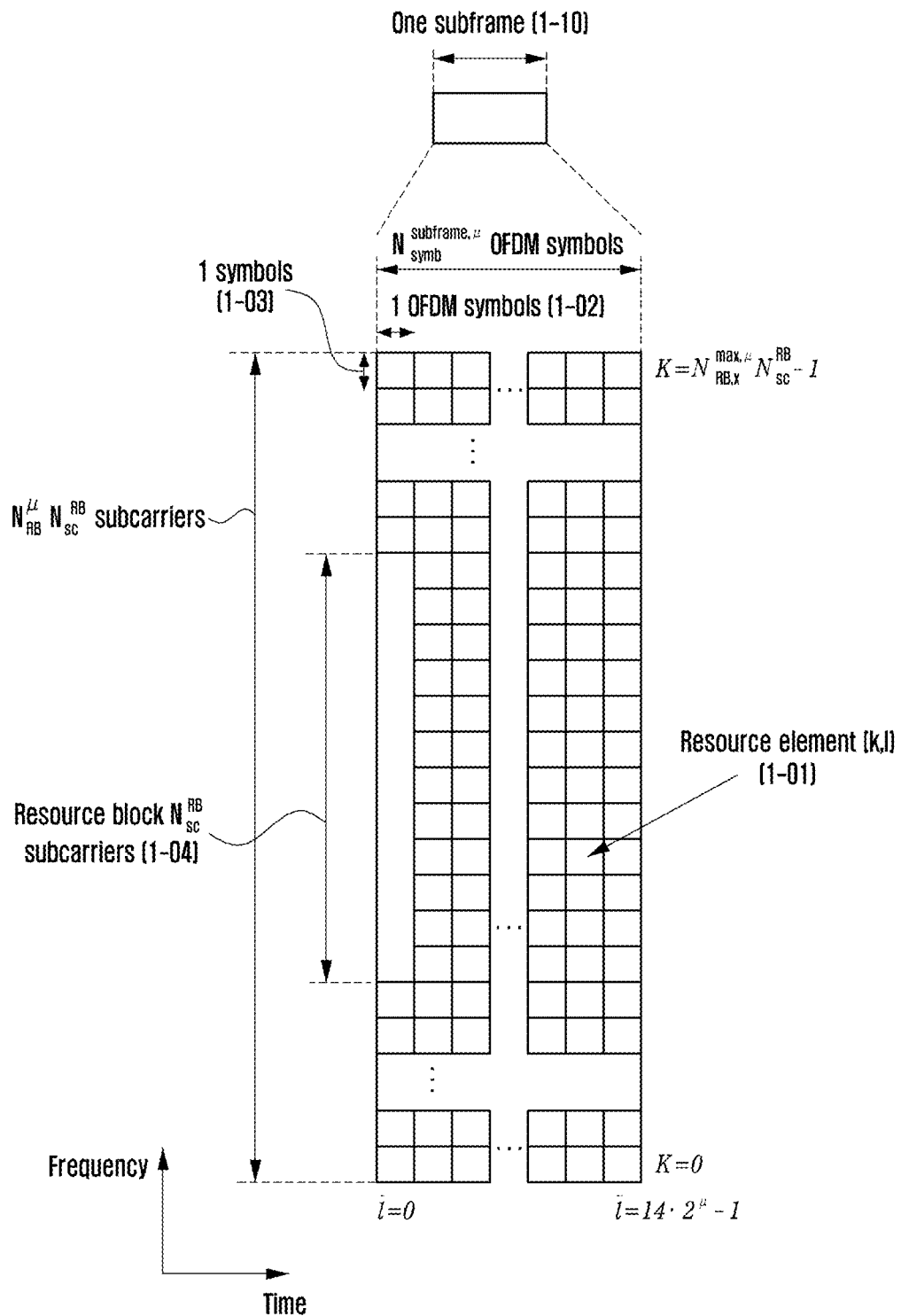
FIG. 1 illustrates a diagram of a time-frequency domain transmission structure of an LTE, LTE-A, NR, or similar wireless communication system of the disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, according to some embodiments, "~unit" may include one or more processors.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. Hereinafter, a base station is a subject performing resource allocation of a terminal, and may be at least one of a gNode B, an eNode B, a Node B, a base station (BS), a wireless access unit, a base station controller, or a node on a network. A terminal may include a user equipment (UE), a mobile station (MS), a cellular phone, a smart phone, a computer, or a multimedia system capable of performing a communication function. Of course, the base station and the terminal are not limited to the above examples.

Hereinafter, the disclosure describes a technique for a UE to receive broadcast information from an eNB in a wireless communication system. The disclosure relates to a communication scheme for fusing a 5G communication system for supporting a higher data rate after a 4G system with IoT technology and a system thereof. The disclosure may be applied to intelligent services (e.g., smart homes, smart buildings, smart cities, smart cars or connected cars, healthcare, digital education, retail, security and safety related services, etc.) based on 5G communication technologies and IoT-related technologies.

Terms referring to broadcast information, terms referring to control information, terms relating to communication coverage, terms referring to state changes (e.g. events), terms referring to network entities, terms referring to messages, terms referring to components of a device, and the like which are used in the following description are illustrated for convenience of description. Therefore, the disclosure is not limited to the terms described below, and other terms having equivalent technical meanings may be used.

Hereinafter, for convenience of description below, some terms and names defined in the 3rd generation partnership project long term evolution (3GPP LTE) standard may be used. However, the disclosure is not limited to the above terms and names, and may be equally applied to systems conforming to other standards.

Wireless communication systems have evolved from early systems providing voice-oriented services to broadband wireless communication systems providing high-speed and high-quality packet data services as in the communication standards such as high speed packet access (HSPA), long-term evolution (LTE) or evolved universal terrestrial radio access (E-UTRA), LTE-advanced (LTE-A), and LTE-pro of 3GPP, high rate packet data (HRPD) and ultra mobile broadband (UMB) of 3GPP2, and 802.16e of IEEE.

As a representative example of the broadband wireless communication systems, the LTE system employs orthogonal frequency division multiplexing (OFDM) for downlink (DL) transmission and employs single-carrier frequency division multiple access (SC-FDMA) for UL transmission. A UL refers to a radio link through which a UE or MS transmits data or control signals to an eNB or BS, and a DL refers to a radio link through which an eNB or BS transmits data or control signals to a UE or MS. In such a multiple access scheme, time-frequency resources carrying data and control information of each user are generally allocated and used not to overlap to achieve orthogonality, thereby distinguishing between the data and the control information.

As a future communication system after LTE, that is, a 5G communication system should be able to freely reflect various requirements of users and service providers, so that services satisfying the various requirements should be supported. Services considered for the 5G communications systems include enhanced mobile broadband (eMBB), massive machine type communication (mMTC), and ultra reliability low latency communication (URLLC), etc.

According to some embodiments, eMBB aims to provide higher data rate than that supported by the existing LTE, LTE-A, or LTE-Pro. For example, in a 5G communication system, an eMBB should be able to provide a peak data rate of 20 Gbps in downlink and a peak data rate of 10 Gbps in downlink in terms of one eNB. At the same time, it is necessary to provide an increased user perceived data rate of a UE. In order to meet such requirements, there is a need for an improvement in transmission and reception technology, including an improved multi input multi output (MIMO) transmission technology. In addition, by using a frequency bandwidth wider than 20 MHz in the frequency band of 3 to 6 GHz or 6 GHz or more instead of the 2 GHz band used by the current LTE, it is possible to meet the data rate required by 5G communication systems.

At the same time, the mMTC is considered to support application services such as Internet of Thing (IoT) in 5G communication systems. In order to efficiently provide the IoT, the mMTC may require support for access of a large scale UE in a cell, coverage improvement of a UE, an improved battery time, cost reduction of the UE, and the like. Since the IoT is attached to various sensors and various devices to provide a communication function, it should be able to support a large number of UEs (e.g., 1,000,000 UEs/km$^2$) in a cell. In addition, a UE supporting the mMTC is likely to be located in a shadow area that a cell does not cover, such as the basements of buildings due to the characteristics of the service, so that wider coverage than those of other services provided by the 5G communication system may be required. The UE supporting the mMTC should be configured as a low-cost UE, and may require a significantly long battery lifetime because it is difficult to frequently exchange the battery of the UE.

Finally, the URLLC is cellular-based wireless communication services used for a mission-critical purpose and should provide communication that provides ultra-low latency and ultra reliability, as services used for remote control for robot or machinery, industrial automation, unmanned aerial vehicle, remote health care, emergency alert, and the like. For example, the service supporting the URLLC should satisfy air interface latency less than 0.5 milliseconds, and at the same time has a requirement of a packet error rate of 10 to 5 or less. Therefore, for the service supporting the URLLC, 5G systems should provide a smaller transmit time interval (TTI) than those of other services, and at the same time, requires a design requirement that should allocate a wide resource in a frequency band. However, the above-described mMTC, URLLC, and eMBB are merely examples of different service types, and the service types to which the disclosure is applied are not limited to the above-described examples.

The services considered in the above-mentioned 5G communication system should be fused with each other based on one framework and provided. That is, for efficient resource management and control, it is preferable that each service is integrated and controlled and transmitted as one system rather than executed independently.

In addition, in the following description, embodiments of the disclosure will be described using an LTE, LTE-A, LTE Pro or NR system as one example, but the embodiment of the disclosure can be applied to other communication systems having a similar technical background or channel form. In addition, the embodiments of the disclosure may be applied to other communication systems through some modifications within the scope of the disclosure without departing from the scope of the disclosure by the judgment of the skilled person.

Hereinafter, a frame structure of a 5G system will be described in more detail with reference to the accompanying drawings.

FIG. 1 illustrates a diagram of a basic structure of a time-frequency domain, which is a radio resource region in which data or a control channel is transmitted in a 5G system of the disclosure.

In FIG. 1, a horizontal axis represents a time domain and a vertical axis represents a frequency domain. The basic unit of resources in the time and frequency domain is a resource element (RE) 1-01, which can be defined as 1 orthogonal frequency division multiplexing (OFDM) symbol 1-02 on the time axis and 1 subcarrier 1-03 on the frequency axis. Consecutive (e.g., 12) REs in the frequency domain may constitute one resource block (RB) 1-04.

Figure 2:
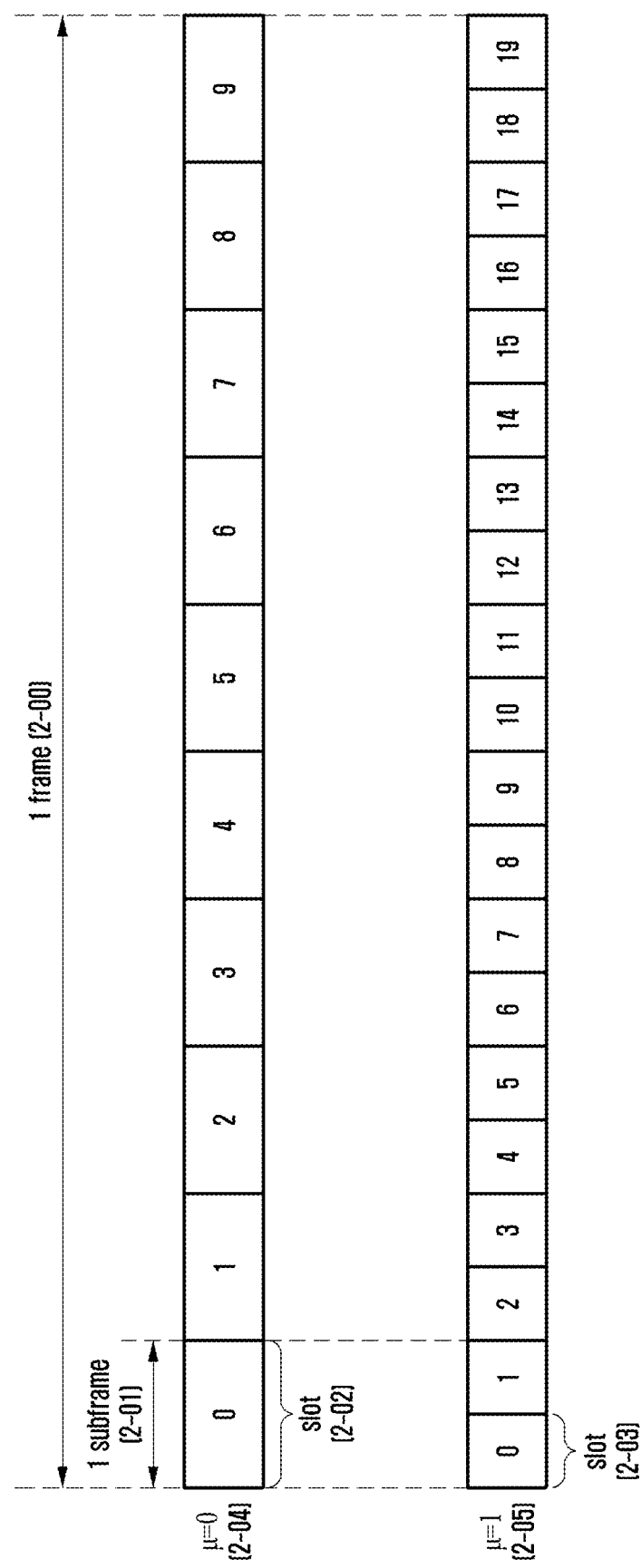
FIG. 2 illustrates a diagram of a frame, subframe, and slot structure in 5G of the disclosure.

FIG. 2 illustrates a diagram of a slot structure in a 5G system according to the disclosure.

In FIG. 2, an example of the structure of a frame 2-00, a subframe 2-01, and a slot 2-02 is shown. One frame 2-00 may be defined as 10 ms. One subframe 2-01 may be defined as 1 ms, and thus, one frame 2-00 may be composed of a total of 10 subframes 2-01. One slot 2-02 or 2-03 may be defined as 14 OFDM symbols (i.e., the number of symbols per slot ($N_{symb}^{slot}$)=14). One subframe 2-01 may be composed of one or a plurality of slots 2-02 and 2-03, and the number of slots 2-02 and 2-03 per one subframe 2-01 may vary depending on a configuration value μ 2-04 or 2-05 for a subcarrier spacing. In an example of FIG. 2, a case in which a configuration value for a subcarrier spacing is μ=0 (2-04) or μ=1 (2-05) is illustrated. If μ=0 (2-04), one subframe 2-01 may be composed of one slot 2-02, and if μ=1 (2-05), one subframe 2-01 may be composed of two slots 2-03. That is, the number of slots per subframe ($N_{slot}^{subframe,\mu}$) may vary depending on the configuration value μ for the subcarrier spacing, and thus the number of slots per frame ($N_{slot}^{frame,\mu}$) may vary. $N_{slot}^{subframe,\mu}$ and $N_{slot}^{frame,\mu}$ according to each subcarrier spacing configuration μ can be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In an NR, one component carrier (CC) or serving cell may be composed of up to 250 RBs or more. Thus, when a UE always receives the entire serving cell bandwidth, such as LTE, the power consumption of the UE may be extreme, and in order to solve this problem, an eNB may configure one or more bandwidth parts (BWP) to the UE so that it is possible to support the UE to change a reception area in a cell. In the NR, the eNB may configure "initial BWP", which is a bandwidth of CORESET #0 (or a common search space (CSS)), to the UE through an MIB. Next, the eNB may configure an initial BWP (first BWP) of the UE through RRC signaling, and may inform at least one BWP configuration information that may be indicated through a DCI in the future. Next, the eNB may indicate which band the UE uses by informing a BWP ID through the DCI. If the UE does not receive the DCI at a currently assigned BWP for a specific time or more, the UE returns to a "default BWP" and attempts to receive the DCI.

Figure 3:
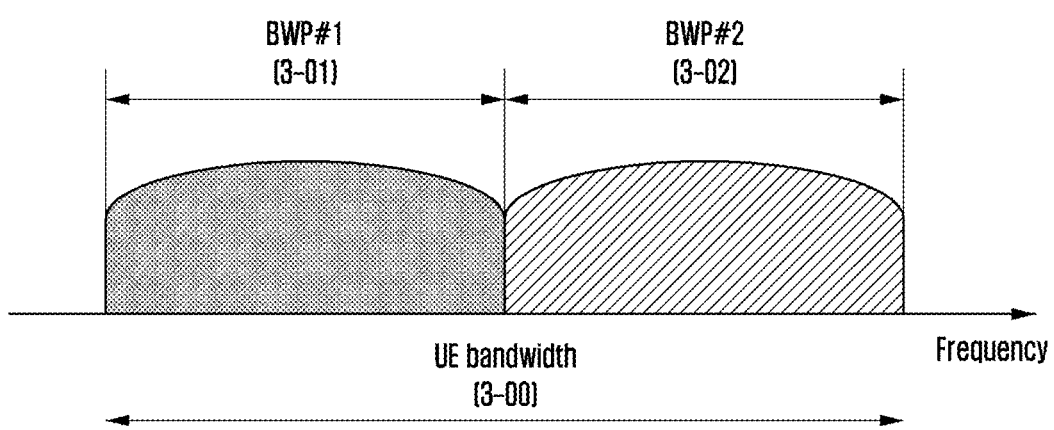
FIG. 3 illustrates a diagram of an example of a bandwidth part (BWP) configuration according to an embodiment of the disclosure.

FIG. 3 illustrates a diagram of an example of a partial bandwidth configuration according to an embodiment of the disclosure.

FIG. 3 illustrates an example in which a UE bandwidth 3-00 is configured as two BWPs, that is, a BWP #1 3-05 and a BWP #2 3-10. An eNB may configure one or a plurality of BWPs to the UE, and may configure information of the following Table 2 for each BWP.

TABLE 2

Configuration information 1: Bandwidth of BWP (the number of physical resource blocks (PRBs) constituting BWP)
Configuration information 2: Frequency position of BWP (offset value relative to reference point as this information, reference point may be, for example, a center frequency of a carrier, a sync signal, a sync signal raster, and the like)
Configuration information 3: Numerology (e.g., subcarrier spacing, cyclic prefix (CP) length, and the like) of BWP
Others In addition to the configuration information, various parameters related to the BWP may be configured to the UE. The above information may be transmitted to the UE by the eNB through higher layer signaling, for example, RRC signaling. At least one BWP of the configured one or plurality of BWPs may be activated. Information about whether the configured BWP is activated may be transmitted semi-statically from the eNB to the UE through RRC signaling, or may be dynamically transmitted through an MAC control element (CE) or a DCI.

The configuration of the BWP supported by the 5G communication system may be used for various purposes.

As an example, when a bandwidth supported by the UE is smaller than a system bandwidth, this may be supported through the configuration of the BWP. For example, by configuring the frequency position (configuration information 1) of the BWP to the UE in Table 2, the UE may transmit and receive data at a specific frequency position within the system bandwidth.

As another example, an eNB may configure a plurality of BWPs to a UE for the purpose of supporting different numerologies. For example, in order to support both data transmission and reception using a subcarrier spacing of 15 kHz and a subcarrier spacing of 30 kHz to a UE, two BWPs may be configured to use a subcarrier spacing of 15 kHz and 30 kHz, respectively. Different BWPs may be FDM, and when data is desired to be transmitted/received at a specific subcarrier spacing, the BWP configured at the corresponding subcarrier spacing may be activated.

As another example, for the purpose of reducing power consumption of a UE, an eNB may configure a BWP having different sizes of bandwidths to the UE. For example, when the UE supports a significantly large bandwidth, for example, a bandwidth of 100 MHz and always transmits and receives data in the corresponding bandwidth, it may cause significantly large power consumption. In particular, in the absence of traffic, it is significantly inefficient in terms of power consumption to monitor an unnecessary downlink control channel for a large bandwidth of 100 MHz. Therefore, in order to reduce the power consumption of the UE, the eNB may configure a BWP of a relatively small bandwidth, for example, a BWP of 20 MHz. In a situation where there is no traffic, the UE may perform a monitoring operation in the BWP of 20 MHz and, when data is generated, may transmit and receive data using a BWP of 100 MHz according to the instruction of the eNB.

Figure 4:
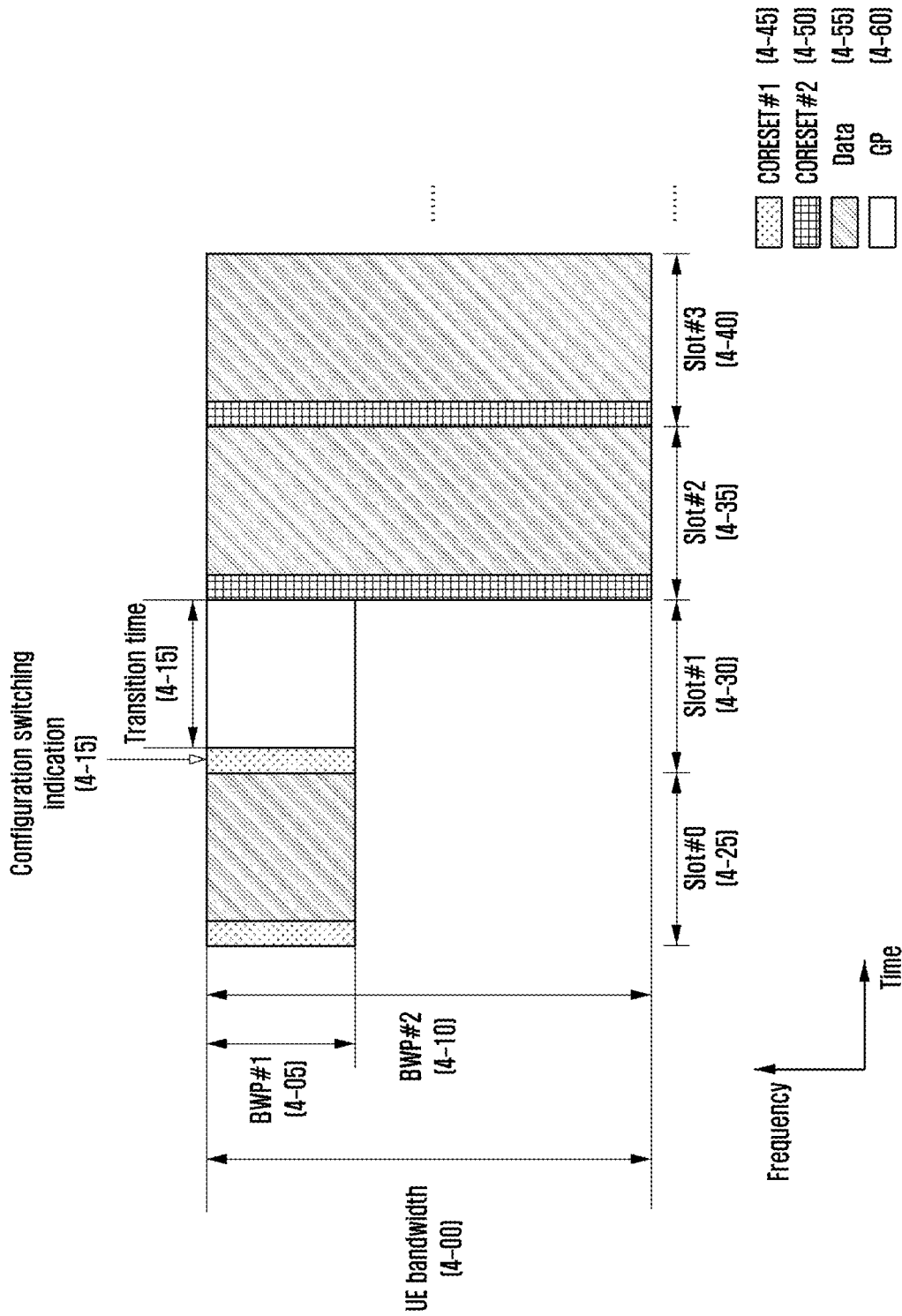
FIG. 4 illustrates a diagram of an example of BWP indication and switching according to an embodiment of the disclosure.

FIG. 4 illustrates a diagram of a method of switching a dynamic configuration of a BWP according to an embodiment of the disclosure.

As described in Table 2, the eNB may configure one or a plurality of BWPs to the UE, and may inform information on the bandwidth, frequency position, and numerology of the BWP as the configuration for each BWP. FIG. 4 illustrates an example in which two BWPs, which are a BWP #1 4-05 and a BWP #2 4-10, are configured within a UE bandwidth 4-00 to one UE. One or a plurality of BWPs may be activated among the configured bandwidths, and in FIG. 4, an example in which one BWP is activated is shown. In FIG. 4, a BWP #1 4-02 is activated among BWPs configured in a slot #0 4-25, and the UE may monitor a PDCCH in a control resource set #1 4-45 configured in the BWP #1 4-05 and may transmit and receive data 4-55 in the BWP #1 4-05. In the control resource set in which the UE receives the PDCCH may vary depending on which BWP is activated among the configured BWPs, a bandwidth in which the UE monitors the PDCCH may vary.

The eNB may further transmit an indicator for switching the configuration of the BWP to the UE. Here, switching the configuration for the BWP may be considered to be the same as activating a specific BWP (e.g., switching the activation from a BWP A to a BWP B). The eNB may transmit a configuration switching indicator to the UE in a specific slot. Here, the UE may receive the configuration switching indicator from the eNB, and may determine a BWP to be activated and monitor a PDCCH in a control resource set configured in the activated BWP by applying the switched configuration according to the configuration switching indicator starting from a specific time point.

In FIG. 4, the eNB may transmit, to the UE, a configuration switching indication 4-15 for instructing to switch the activated BWP from the existing BWP #1 4-05 to the BWP #2 4-10 in a slot #1 4-30. The UE may receive the corresponding indicator and may then activate a BWP #2 6-10 according to the content of the indicator. In this case, a transition time 4-20 for switching the BWP may be required, and thus a time point for switching and applying the BWP to be activated may be determined. FIG. 4 illustrates a case where the transition time 4-20 of one slot is required after the configuration switching indicator 4-15 is received. Data transmission and reception may not be performed at the transition time 4-60. Accordingly, the BWP #2 4-10 may be activated in a slot #2 4-35 to perform an operation of transmitting and receiving a control channel and data to the corresponding BWP.

The eNB may previously configure one or a plurality of BWPs to the UE by higher layer signaling (e.g., RRC signaling), and may instruct activation in a method in which the configuration switching indicator 4-15 is mapped with one of the configurations of BWPs previously configured by the eNB. For example, an indicator of log 2N bits may select and indicate one of N predetermined BWPs. Table 3 below shows an example of indicating configuration information on a BWP using a 2-bit indicator.

TABLE 3

| Indicator value | BWP configuration |
| --- | --- |
| 00 | BWP configuration A configured through higher layer signaling |
| 01 | BWP configuration B configured through higher layer signaling |

TABLE 3-continued

| Indicator value | BWP configuration |
| --- | --- |
| 10 | BWP configuration C configured through higher layer signaling |
| 11 | BWP configuration D configured through higher layer signaling |

The above-described configuration switching indicator 4-15 for the BWP may be transmitted from the eNB to the UE in the form of medium access control (MAC) control element (CE) signaling or L1 signaling (e.g., a common DCI, a group-common DCI, or a UE-specific DCI).

According to the configuration switching indicator 4-15 for the BWP described above, from which time point the BWP activation is applied may depend on the following. From which time point the configuration switching is applied may depend on a predefined value (e.g., applied after N (≥1) slot after the configuration switching indicator is received). Alternatively, from which time point the configuration switching is applied may be configured by the eNB to the UE through higher layer signaling (e.g., RRC signaling), or a part thereof may be included in the content of the configuration switching indicator 4-15 and transmitted. Alternatively, from which time point the configuration switching is applied may be determined in a combination of the above methods. After receiving the configuration switching indicator 4-15 for the BWP, the UE may apply the switched configuration starting from a time point obtained by the above method.

Hereinafter, a downlink control channel in a 5G communication system will be described in more detail with reference to the accompanying drawings.

Figure 5:
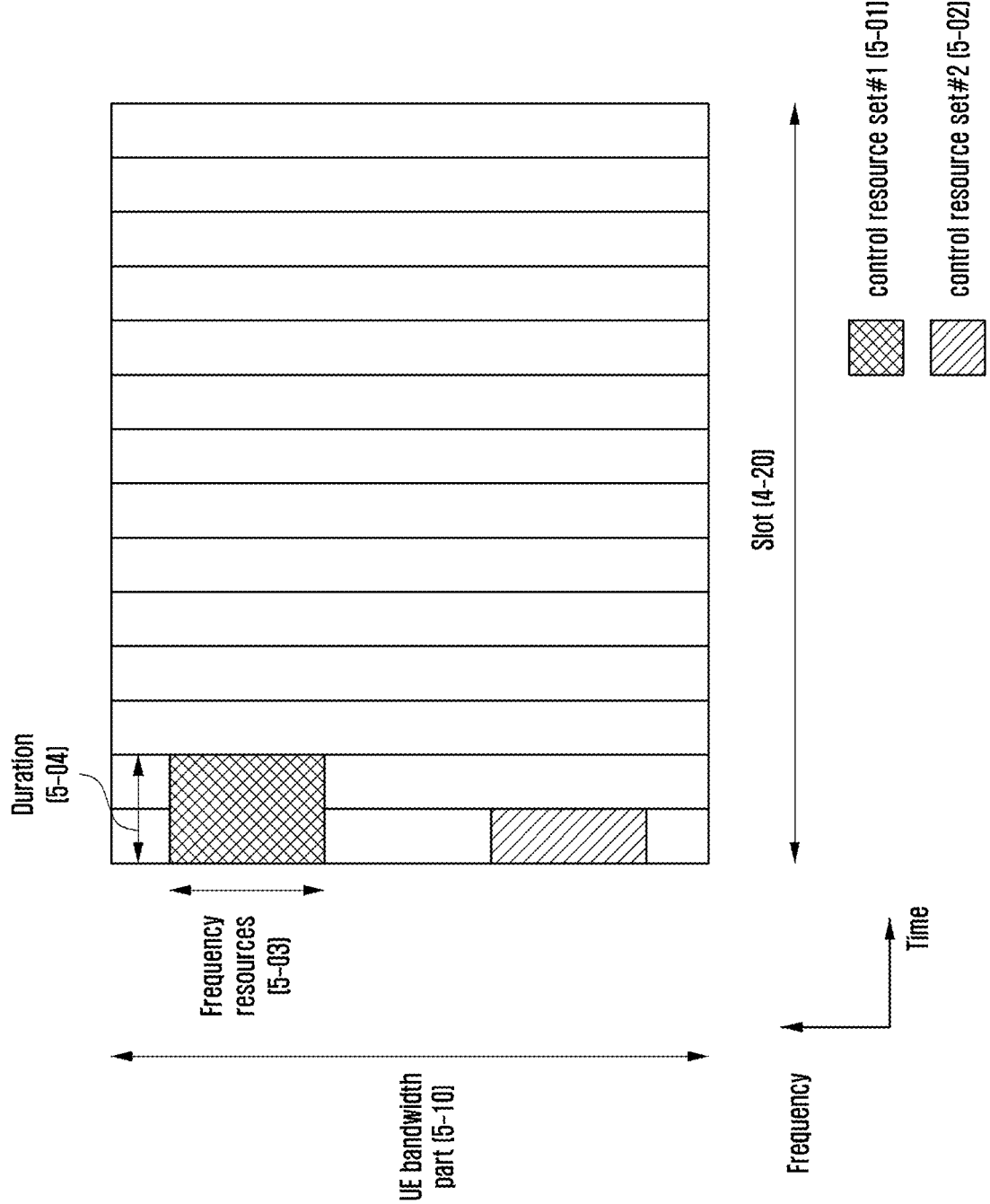
FIG. 5 illustrates a diagram of an example of configuring a control resource set of a downlink control channel according to an embodiment of the disclosure.

FIG. 5 illustrates a diagram of an example of a control resource set (CORESET) in which a downlink control channel is transmitted in a 5G wireless communication system according to an embodiment of the disclosure.

FIG. 5 illustrates an example in which a BWP 5-10 of a UE is configured on the frequency axis and two control resource sets (a control resource set #1 5-01 and a control resource set #2 5-02) are configured in one slot 5-20 on the time axis. The control resource sets 5-01 and 5-02 may be configured in a specific frequency resource 5-03 within the entire UE BWP 5-10 on the frequency axis. The control resource sets 5-01 and 5-02 may be configured as one or a plurality of OFDM symbols on the time axis and may be defined as a control resource set duration 5-04. In the example of FIG. 5, the control resource set #1 5-01 is configured by the control resource set duration of two symbols, and the control resource set #2 5-02 is configured by the control resource set duration of one symbol.

The control resource set in the 5G described above may be configured by the eNB to the UE through higher layer signaling (e.g., system information, master information block (MIB), radio resource control (RRC) signaling). Configuring the control resource set to the UE means providing information such as a control resource set identifier, a frequency position of a control resource set, and a symbol length of the control resource set. For example, information of Table 4 may be included in the above information.

TABLE 4

```
ControlResourceSet ::=                   SEQUENCE {
    -- Corresponds to L1 parameter 'CORESET-ID'
    controlResourceSetId                 ControlResourceSetId,
    frequencyDomainResources             BIT STRING (SIZE (45)),
    duration                             INTEGER (1..maxCoReSetDuration),
    cce-REG-MappingType                  CHOICE {
        interleaved                      SEQUENCE {
            reg-BundleSize                  ENUMERATED {n2, n3, n6},
            precoderGranularity             ENUMERATED {sameAsREG-
    bundle, allContiguousRBs},
            interleaverSize                 ENUMERATED {n2, n3, n6}
        shiftIndex
            INTEGER(0..maxNrofPhysicalResourceBlocks-1)
        },
        nonInterleaved                   NULL
    },
    tci-StatesPDCCH                      SEQUENCE(SIZE (1..maxNrofTCI-
        StatesPDCCH)) OF TCI-StateId         OPTIONAL,
    tci-PresentInDCI                     ENUMERATED {enabled}
}
```

In Table 4, tci-StatesPDCCH (simply named TCI state) configuration information may include information on one or more synchronization signal (SS)/physical broadcast channel (PBCH) block indexes that are in a quasi co located (QCL) relationship with a DMRS transmitted from the corresponding control resource set, or information on a channel state information reference signal (CSI-RS) index.

Hereinafter, methods of allocating time and frequency resources for data transmission in an NR will be described.

In the NR, the following detailed frequency domain resource allocation (FD-RA) methods are provided in addition to a frequency domain resource candidate assignment through the BWP indication.

Figure 6:
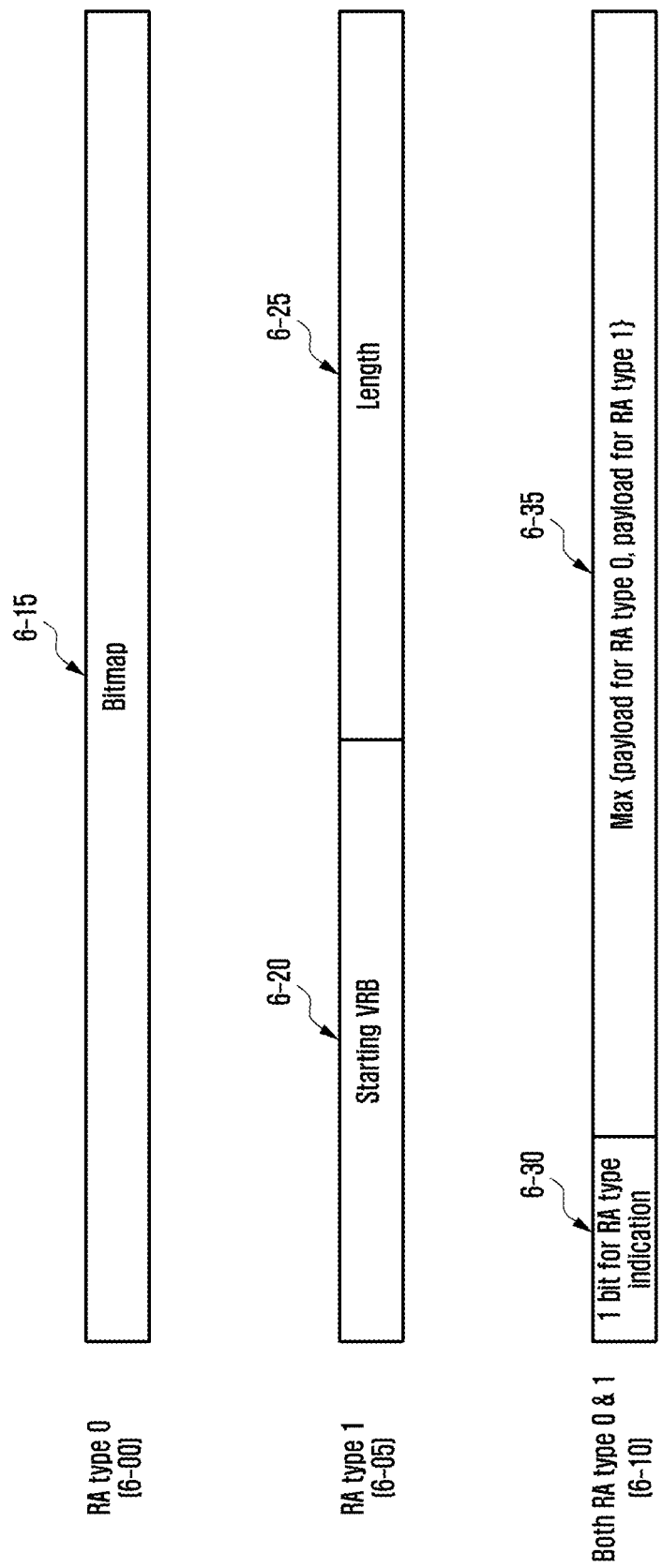
FIG. 6 illustrates a diagram of an example of PDSCH frequency domain resource assignment according to an embodiment of the disclosure.

FIG. 6 illustrates a diagram of an example of PDSCH frequency domain resource assignment according to an embodiment of the disclosure.

FIG. 6 illustrates three frequency domain resource allocation (FD-RA) methods of type 0 6-00, type 1 6-05, and dynamic switch 6-10 which can be configured through a higher layer in an NR.

If a UE is configured to use only resource type 0 through higher layer signaling (6-00), some pieces of downlink control information (DCI) for allocating a PDSCH to the UE have bitmaps composed of $N_{RBG}$-numbered bits. Conditions for this will be described later. In this case, $N_{RBG}$ refers to the number of resource block groups (RBGs) determined as shown in Table 5 below according to a BWP size allocated by the BWP indicator and a higher layer parameter RBG-size, and data is transmitted to the RBG displayed as "1" by the bitmap.

TABLE 5

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

If the UE is configured to use only resource type 1 through higher layer signaling (6-05), some pieces of DCI for allocating a PDSCH to the UE have frequency domain resource assignment information composed of $[\log_2(N_{RB}^{DL,BWP}(N_{RB}^{DL,BWP}+1)/2)]$-numbered bits. Conditions for this will be described later. Through this, an eNB may configure a starting virtual RB (VRB) 6-20 and a length 6-25 of the frequency domain resources consecutively allocated from the starting VRB 6-20. Each VRB is mapped 1:1 with a PRB through a specific rule.

If the UE is configured to use both resource type 0 and resource type 1 through higher layer signaling (6-10), some pieces of DCI for allocating a PDSCH to the UE have frequency domain resource assignment information composed of bits of a large value 6-35 among a payload 6-15 for configuring the resource type 0 and payloads 6-20 and 6-25 for configuring the resource type 1. Conditions for this will be described later. In this case, if one bit is added to the first part (most significant bit (MSB)) of the frequency domain resource assignment information in the DCI to obtain "0", this indicates that resource type 0 is used, and when "1" is obtained, this indicates that resource type 1 is used.

Figure 7:
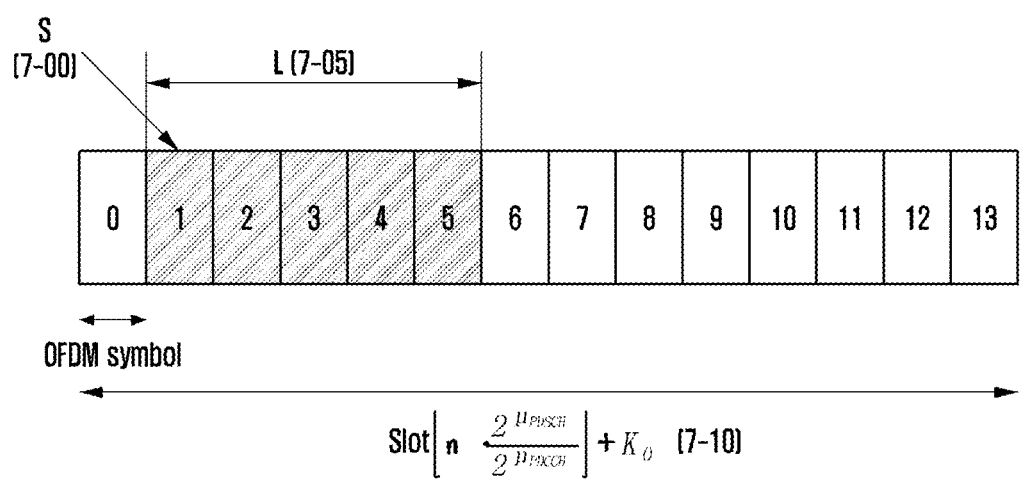
FIG. 7 illustrates a diagram of an example of time domain resource assignment of an NR according to an embodiment of the disclosure.

FIG. 7 illustrates a diagram of an example of time domain resource assignment of an NR according to an embodiment of the disclosure.

Referring to FIG. 7, an eNB can indicate the time domain position of a PDSCH resource according to subcarrier spacings $\mu_{PDSCH}$ and $\mu_{PDCCH}$ of a data channel and a control channel configured by higher layer signaling, a scheduling offset (K0) value, OFDM symbol start position 7-00 and length 7-05 within one slot indicated dynamically through a DCI.

Figure 8:
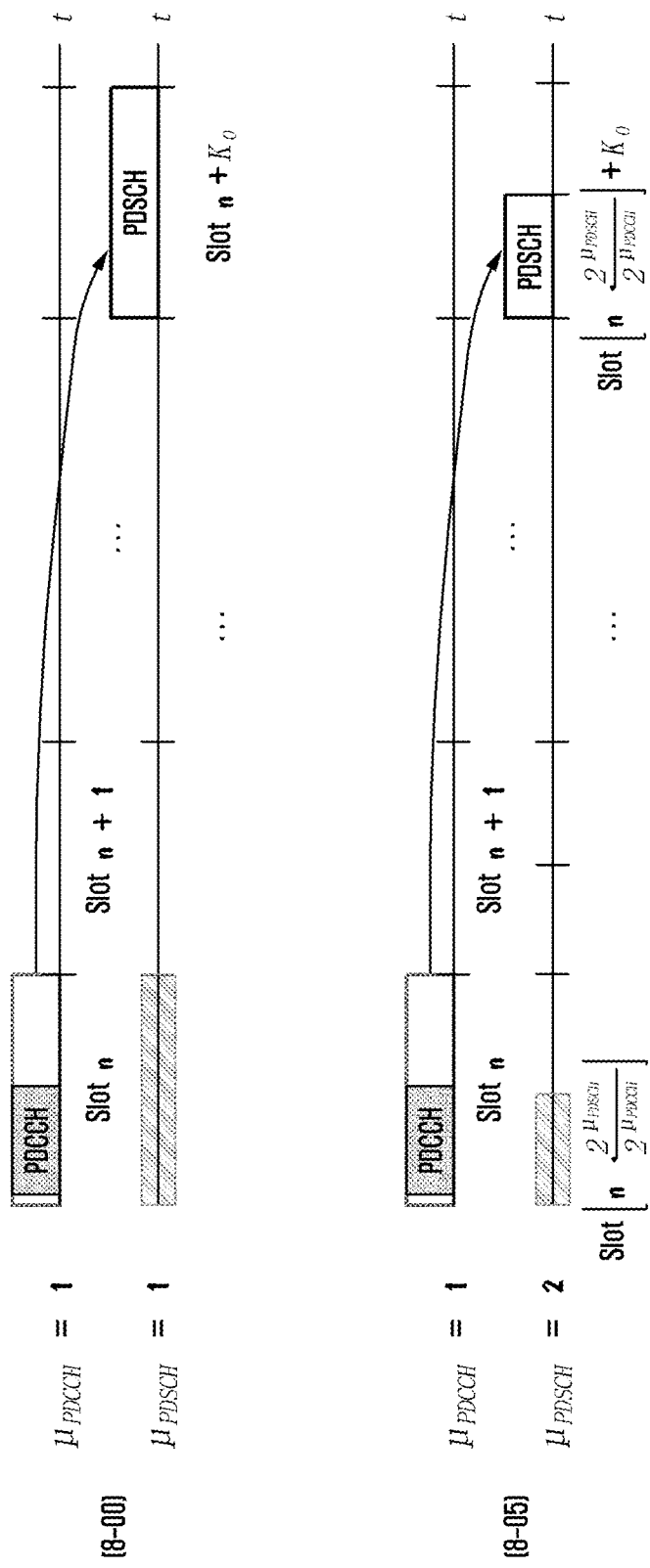
FIG. 8 illustrates a diagram of an example of time domain resource assignment according to subcarrier spacings of a data channel and a control channel according to an embodiment of the disclosure.

FIG. 8 illustrates a diagram of an example of time domain resource assignment according to subcarrier spacings of a data channel and a control channel according to an embodiment of the disclosure.

Referring to FIG. 8, when the subcarrier spacings of a data channel and a control channel are the same (8-00, $\mu_{PDSCH}=\mu_{PDCCH}$), an eNB and a UE may be aware of the occurrence of scheduling offset according to a predetermined slot offset K0 because the slot numbers of data and control are the same. On the other hand, when the subcarrier spacings of the data channel and the control channel are different (8-05, $\mu_{PDSCH}\neq\mu_{PDCCH}$), the eNB and the UE may be aware of the occurrence of scheduling offset according to the predetermined slot offset K0 based on the subcarrier spacing of a PDCCH because the slot numbers of data and control are different.

In an NR, various types of DCI formats are provided according to the purpose as shown in Table 6 below for efficient control channel reception of a UE.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, an eNB may use DCI format 0_0 or DCI format 0_1 to allocate (scheduling) PDSCH to one cell.

DCI format 0_1 includes at least the following information when transmitted with a CRC scrambled by cell radio network temporary identifier (C-RNTI), configured scheduling RNTI (CS-RNTI), or new-RNTI:

Identifier for DCI formats (1 bits): always configured to 1 as DCI format indicator Frequency domain resource assignment ($N_{RBG}$ bits or $[\log_2(N_{RB}^{DL,BWP}(N_{RB}^{DL,BWP}+1)/2)]$ bits): indicates frequency domain resource assignment, and if DCI-format 1_0 is monitored in a UE-specific search space, $N_{RB}^{DL,BWP}$ is the size of an active DL BWP. Otherwise, $N_{RB}^{DL,BWP}$ is the size of an initial DL BWP. $N_{REG}$ is the number of resource block groups. A detailed method thereof is referred to the frequency domain resource assignment.

Time domain resource assignment (0 to 4 bits): indicates time domain resource assignment according to the above description.

VRB-to-PRB mapping (1 bit): if it is "0", this indicates non-interleaved, and if it is "1", this indicates interleaved VRP-to-PRB mapping.

Modulation and coding scheme (5 bits): indicates modulation order and coding rate used for PDSCH transmission.

New data indicator (1 bit): indicates whether PDSCH is initially transmitted or retransmitted according to whether toggle occurs.

Redundancy version (2 bits): indicates redundancy version used for PDSCH transmission.

HARQ process number (4 bits): indicates HARQ process number for PDSCH transmission.

Downlink assignment index (2 bits): DAI indicator

TPC command for scheduled PUCCH (2 bits): PUCCH power control indicator

PUCCH resource indicator (3 bits): indicates one of 8 resources configured by higher layer, as PUCCH resource indicator.

PDSCH-to-HARQ_feedback timing indicator (3 bits): indicates one of 8 feedback timing offsets configured by higher layer, as HARQ feedback timing indicator.

DCI format 1_1 includes at least the following information when transmitted with a CRC scrambled by C-RNTI, CS-RNTI, or new-RNTI:

Identifier for DCI formats (1 bit): always configured to 1 as DCI format indicator Carrier indicator (0 or 3 bits): indicates CC (or cell) to which PDSCH allocated by the corresponding DCI is transmitted.

Bandwidth part indicator (0, 1, or 2 bits): indicates BWP to which PDSCH allocated by the corresponding DCI is transmitted.

Frequency domain resource assignment (payload determination according to the frequency domain resource assignment): indicates frequency domain resource assignment, and $N_{RB}^{DL,BWP}$ is the size of active DL BWP. A detailed method thereof is referred to the frequency domain resource assignment.

Time domain resource assignment (0 to 4 bits): indicates time domain resource assignment according to the above description.

VRB-to-PRB mapping (0 or 1 bit): if it is "0", this indicates non-interleaved, and if it is "1", this indicates interleaved VRP-to-PRB mapping. If frequency domain resource assignment is configured to resource type 0, 0 bit is obtained.

PRB bundling size indicator (0 or 1 bit): if higher layer parameter PRB-BundlingType is not configured or configured as "static", 0 bit is obtained, and if the same is configured as "dynamic", 1 bit is obtained.

Rate matching indicator (0 or 1 or 2 bits): indicates rate matching pattern.

ZP CSI-RS trigger (0 or 1 or 2 bits): indicator for triggering aperiodic ZP CSI-RS For transport block 1:
  Modulation and coding scheme (5 bits): indicates modulation order and coding rate for PDSCH transmission.
  New data indicator (1 bit): indicates whether PDSCH is initially transmitted or retransmitted according to whether toggle occurs.
  Redundancy version (2 bits): indicates redundancy version used for PDSCH transmission.

For transport block 2:
  Modulation and coding scheme (5 bits): indicates modulation order and coding rate used for PDSCH transmission.
  New data indicator (1 bit): indicates whether PDSCH is initially transmitted or retransmitted according to whether toggle occurs.
  Redundancy version (2 bits): indicates redundancy version used for PDSCH transmission.

HARQ process number (4 bits): indicates HARQ process number used for PDSCH transmission.

Downlink assignment index (0 or 2 or 4 bits): DAI indicator

TPC command for scheduled PUCCH (2 bits): PUCCH power control indicator

PUCCH resource indicator (3 bits): indicates one of 8 resources configured by higher layer, as PUCCH resource indicator.

PDSCH-to-HARQ_feedback timing indicator (3 bits): indicates one of 8 feedback timing offsets configured by higher layer, as HARQ feedback timing indicator.

Antenna port (4 or 5 or 6 bits): indicates DMRS port CDM group without data.

Transmission configuration indication (0 or 3 bits): TCI indicator

SRS request (2 or 3 bits): SRS transmission request indicator

CBG transmission information (0 or 2 or 4 or 6 or 8 bits): indicator for informing whether code block groups within allocated PDSCH are transmitted. "0" means that the corresponding CBG is not transmitted, and "1" means that the corresponding CBG is transmitted.

CBG flushing out information (0 or 1 bit): indicator for informing whether previous CBGs are contaminated. If it is "0", this means that CBGs may be contaminated, and if it is "1" this means that CBGs may be combinable at the time of retransmission reception.

DMRS sequence initialization (0 or 1 bit): DMRS scrambling ID selection indicator The number of DCIs having different sizes that can be received by a UE per slot in a corresponding cell is up to 4. The number of DCIs having different sizes scrambled by C-RNTI that can be received by a UE per slot in a corresponding cell is up to 3.

Figure 9:
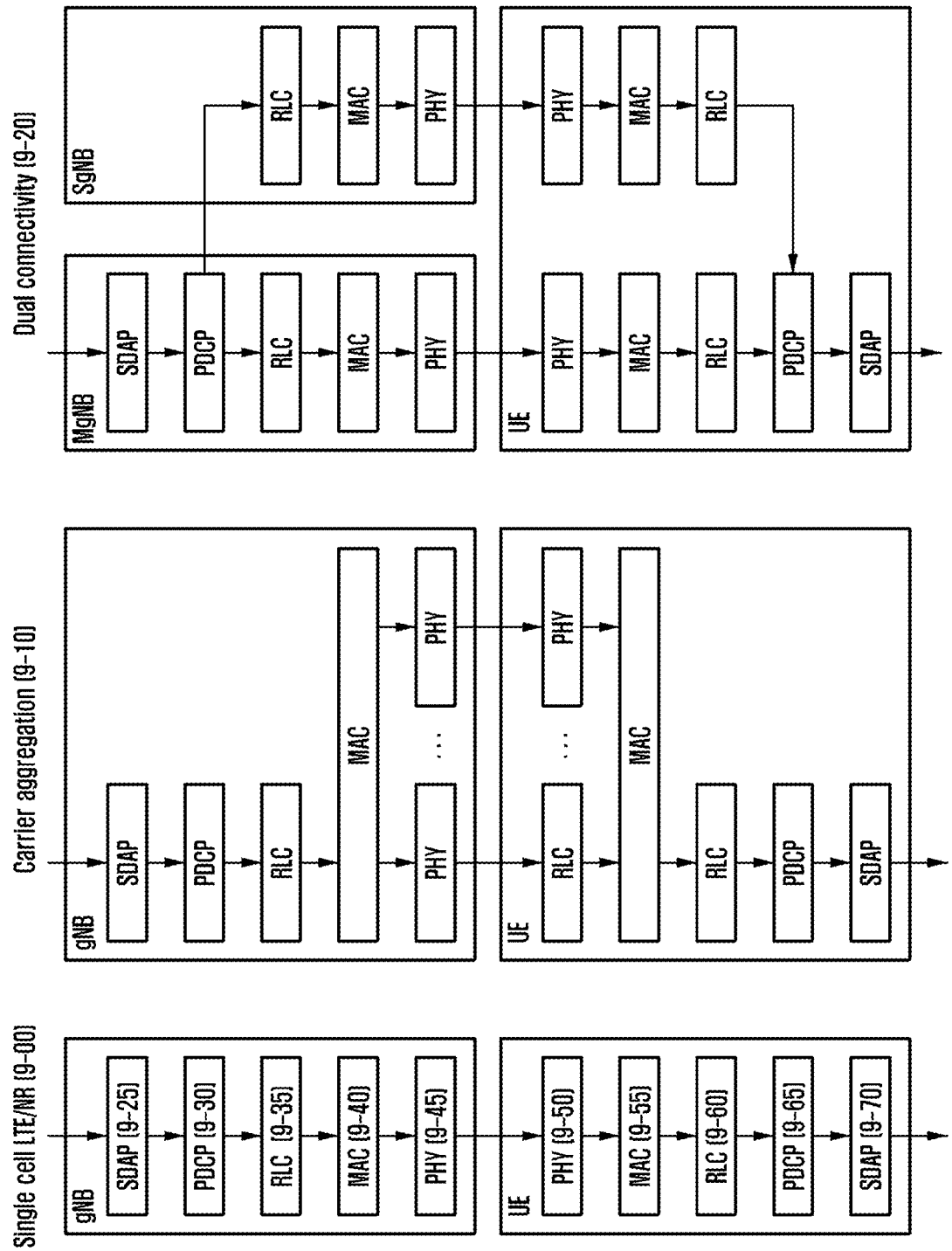
FIG. 9 illustrates a diagram of an eNB and a UE protocol stack when performing single cell, carrier aggregation, and dual connectivity according to an embodiment of the disclosure.

FIG. 9 illustrates a diagram of the structure of an eNB and a UE radio protocol when performing single cell, carrier aggregation, and dual connectivity according to an embodiment of the disclosure.

Referring to FIG. 9, the radio protocols of a next generation telecommunication system include NR service data adaptation protocols (SDAPs) 9-25 and 9-70, NR packet data convergence protocols (PDCPs) 9-30 and 9-65, NR RLC link control 9-35 and 9-60, and NR medium access control (MAC) 9-40 and 9-55, respectively in a UE and an NR eNB.

The main functions of the NR SDAPs 9-25 and 9-70 may include some of the following functions.
transfer of user plane data
mapping between QoS flow and DRB for both DL and UL
marking QoS flow ID in both DL and UL packets
mapping reflective QoS flow to DRB for UL SDAP PDUs.

With respect to the SDAP layer device, a UE may receive configuration about whether to use the header of the SDAP layer device or the function of the SDAP layer device as an RRC message for each PDCP layer device, for each bearer, or for each logical channel. When the SDAP header is configured, it is possible to instruct the UE to update or reconfigure the QoS flow of the UL and the DL and mapping information on the DRB by an NAS reflective QoS configuration 1-bit indicator of the SDAP header and an AS reflective QoS configuration 1-bit indicator. The SDAP header may include QoS flow ID information indicating QoS. The QoS information may be used as data processing priority, scheduling information, etc., for smoothly supporting services.

The main functions of NR PDCPs 9-30 and 9-65 may include some of the following functions.
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PD CP SDUs
Ciphering and deciphering
Timer-based SDU discard in uplink The above-mentioned reordering of the NR PDCP device refers to a function of reordering PDCP PDUs received by a lower layer based on a PDCP sequence number (SN), and may include delivering data to the higher layer in the reordered sequence. Alternatively, the reordering may include a function of delivering data immediately without considering the sequence, a function of recording missing PDCP PDUs by recording the sequences, a function of sending a status report for the missing PDCP PDUs to a transmission side, and a function of requesting re-delivery for the missing PDCP PDUs.

The main functions of the NR RLCs 9-35 and 9-60 may include some of the following functions.

Transfer of upper layer PDUs
In-sequence delivery of upper layer PDUs
Out-of-sequence delivery of upper layer PDUs
Error Correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The in-sequence delivery of the NR RLC device refers to a function of delivering RLC SDUs received from a lower layer to a higher layer in order. If an original RLC SDU is segmented into multiple RLC SDUs and received, the in-sequence delivery may include a function of reassembling and delivering the segmented RLC SDUs, a function of rearranging the received RLC PDUs based on an RLC sequence number (PD) SN or a PDCP sequence number (SN), a function of rearranging the order to record the missing RLC PDUs, a function of sending a status report for the missing RLC PDUs to a transmission side, and a function of requesting retransmission for the missing RLC PDUs. If there is a missing RLC SDU, the in-sequence delivery of the NR RLC device may include a function of delivering only the RLC SDUs up to the missing RLC SDU to a higher layer. Alternatively, if a predetermined timer has expired even if there is a missing RLC SDU, the in-sequence delivery may include a function of delivering all RLC SDUs received before a timer starts to a higher layer in order, or if a predetermined timer has expired even if there is a missing RLC SDU, the in-sequence delivery may include a function of delivering all RLC SDUs received so far to a higher layer in order. In addition, the RLC PDUs may be processed in the order of being received (serial number, regardless of the order of sequence number, or in order of arrival), and may be delivered to the PDCP device in out-of-sequence delivery. Alternatively, in the case of segments, segments stored in a buffer or to be received later may be received, reconfigured into an intact RLC PDU, and processed and delivered to the PDCP device. The NR RLC layer may not include a concatenation function, and may perform the above function in an NR MAC layer or replace the corresponding function with a multiplexing function of the NR MAC layer.

The out-of-sequence delivery of the NR RLC device refers to a function of immediately delivering the RLC SDUs received from the lower layer to the higher layer regardless of the order. If an original RLC SDU is segmented into multiple RLC SDUs and received, the out-of-sequence delivery may include a function of reassembling and delivering the segmented RLC SDUs, and a function of storing and reordering the RLC SNs or PDCP SNs of the received RLC PDUs to record the missing RLC PDUs.

NR MACs 9-40 and 9-55 may be connected to several NR RLC layer devices configured in one UE, and the main function of the NR MAC may include some of the following functions.
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling MBMS service identification
Transport format selection
Padding NR PHY layers 9-45 and 9-50 may channel-code and modulate higher layer data, may convert the same into OFDM symbols, and may transmit the OFDM symbols to a wireless channel. Alternatively, the NR PHY layers 9-45 and 9-50 may demodulate and channel-decode the OFDM symbols received through the wireless channel and may transmit the decoded data to a higher layer.

The detailed structure of the radio protocol structure may be changed in various ways according to a carrier (or cell) operating method. For example, when an eNB transmits data to a UE based on a single carrier (or cell), the eNB and the UE use a protocol structure having a single structure for each layer, as in 9-00. On the other hand, when the eNB transmits data to the UE based on carrier aggregation (CA) using multiple carriers in a single TRP, the eNB and the UE may have a single structure up to the RLC as in 9-10, but may use a protocol structure for multiplexing the PHY layer through an MAC layer. As another example, when the eNB transmits data to the UE based on dual connectivity (DC) using multiple carriers in multiple TRPs, the eNB and the UE may have a single structure up to the RLC as in 9-20, but may use the protocol structure for multiplying the PHY layer through the MAC layer.

In an LTE and an NR, a UE has a procedure of reporting capability supported by the UE to a corresponding eNB while connected to a serving eNB. In the following description, this is referred to as UE capability (reporting). The eNB may transmit a UE capability enquiry message requesting capability report to the UE in the connected state. The message may include a UE capability request for each RAT type. The request for each RAT type may include requested frequency band information. In addition, the UE capability enquiry message may request a plurality of RAT types from one RRC message container, or may include the UE capability enquiry message including the request for each RAT type multiple times and may transmit the message to the UE. That is, the UE capability enquiry may be repeated multiple times, and the UE may configure a corresponding UE capability information message and may report the configured message multiple times. In the next generation telecommunication system, the UE capability request for MR-DC including NR, LTE, EN-DC, etc. can be made. For reference, the UE capability enquiry message is generally transmitted initially after the UE is connected, but may be requested under any condition when it is needed by the eNB.

In the above step, the UE receiving the UE capability report request from the eNB configures UE capability according to RAT type and band information requested from the eNB. In the following, the summary of a method in which a UE configures UE capability in an NR system is shown.

1. If the UE receives a list of LTE and/or NR band from the eNB as a UE capability request, the UE configures a band combination (BC) for EN-DC and NR standalone(SA). That is, a candidate list of BCs for EN-DC and NR SA is configured in the eNB based on bands requested as FreqBandList. Further, the bands has priority in the order described in FreqBandList.

2. If the eNB requests the UE capability report by setting "eutra-nr-only" flag or "eutra" flag, the UE completely removes NR SA BCs from the candidate list of the configured BC. This operation can be performed only when an LTE eNB requests "eutra" capability.

3. Thereafter, the UE removes fallback BCs from the candidate list of the BC configured in the above step. Here, the fallback BC corresponds to a case where a band corresponding to at least one SCell is removed from an arbitrary super set BC, and may be omitted because the super set BC may already cover the fallback BC. This step also applies to MR-DC, i.e., LTE bands. The remaining BCs after this step are the final "candidate BC list".

4. The UE selects BCs to be reported by selecting BCs corresponding to the requested RAT type from the final "candidate BC list". In this step, the UE configures supportedBandCombinationList in a predetermined order. That is, the UE configures BC and UE capability to be reported in the order of a predetermined rat-Type (nr→eutra-nr→eutra). The UE also configures featureSetCombination for the configured supportedBandCombinationList and configures a list of "candidate feature set combination" from the candidate BC list from which a list for fallback BCs (including equal or lower level capabilities) has been removed. The "candidate feature set combination" includes both feature set combinations for NR and EUTRA-NR BC, and may be obtained from the feature set combination of UE-NR-Capabilities and UE-MRDC-Capabilities containers.

5. Also, if the requested rat type is eutra-nr and affects, featureSetCombinations is included in both containers, UE-MRDC-Capabilities and UE-NR-Capabilities. However, the feature set of the NR includes only UE-NR-Capabilities.

After the UE capability is configured, the UE delivers a UE capability information message including the UE capability to the eNB. The eNB then performs appropriate scheduling and transmission/reception management on the UE based on the UE capability received from the UE.

Referring to the descriptions related to PDSCH transmission/reception procedures such as the DCI structure, PDSCH time/frequency resource assignment, radio protocol structure, etc., in release 15, the NR is focused on allocating a PDSCH transmitted from a single transmission point. In the case of coordinated communication in which one UE receives the PDSCH transmitted from a plurality of points, additional standard support is required. For example, since the control information includes one piece of frequency domain and time domain resource assignment information corresponding to one PDSCH, there is a need for a method of extending or processing the above-mentioned information to allocate two or more PDSCHs.

According to the disclosure, a time and frequency resource allocation method for efficiently allocating the plurality of PDSCHs to one UE may be provided to improve coordinated communication efficiency.

Hereinafter, embodiments of the disclosure will be described in detail with the accompanying drawings. In addition, in describing the disclosure, when it is determined that a detailed description of a related function or configuration may unnecessarily obscure the subject matter of the disclosure, the detailed description thereof will be omitted. Terms to be described later are terms defined in consideration of functions in the disclosure, and may be changed according to intentions or customs of users or operators. Therefore, the definition should be made based on the contents throughout the specification.

Hereinafter, a base station is a subject performing resource allocation of a terminal, and may be at least one of a gNode B, a gNB, an eNode B, a Node B, a base station (BS), a wireless access unit, a base station controller, or a node on a network. A terminal may include a user equipment (UE), a mobile station (MS), a cellular phone, a smart phone, a computer, or a multimedia system capable of performing a communication function. In addition, in the following, an embodiment of the disclosure will be described using an NR or LTE/LTE-A system as an example, but the embodiment of the disclosure may be applied to other communication systems having a similar technical background or channel form. In addition, the embodiments of the disclosure may be applied to other communication systems through some modifications within the scope of the disclosure without departing from the scope of the disclosure by the judgment of the skilled person.

The content of the disclosure is applicable to FDD and TDD systems.

Hereinafter, in the disclosure, higher signaling is a signal transmission method in which data is transmitted from an eNB to a UE using a downlink data channel of a physical layer or transmitted from a UE to an eNB using an uplink data channel of a physical layer, and may be referred to as RRC signaling, PDCP signaling, or MAC CE.

Hereinafter, in the disclosure, in determining whether to apply coordinated communication, a UE may use various methods such as a method in which PDCCH(s) for allocating PDSCH to which coordinated communication is applied has a specific format, a method in which the PDCCH(s) for allocating PDSCH to which coordinated communication is applied includes a specific indicator for informing whether coordinated communication is applied, a method in which the PDCCH(s) for allocating PDSCH to which coordinated communication is applied is scrambled to a specific RNTI, or a method in which it is assumed that coordinated communication is applied in a specific section indicated by a higher layer. Hereinafter, for convenience of description, a case in which a UE receives a PDSCH to which coordinated communication is applied based on conditions similar to the above will be referred to as an NC-JT case.

Hereinafter, in the disclosure, determining a priority between A and B means selecting one having a higher priority according to a predetermined priority rule to perform an operation corresponding thereto or omitting (or dropping) an operation for the other one having a lower priority.

In the following description of the disclosure, the above-examples will be described through a plurality of embodiments, but the examples are not independent and one or more embodiments can be applied at the same time or in combination.

First Embodiment: Multiple DCI Reception for NC-JT

Unlike the existing wireless communication system, a 5G wireless communication system can support not only services requiring high transmission speeds but also services having very short transmission delays and services requiring high connection density. In a wireless communication network including a plurality of cells, a transmission and reception point (TRP), or a beam, coordinated communication (coordinated transmission) among each cell, TRP, and/or beam is one of techniques that can increase the strength of a signal received by a UE or efficiently perform interference control among each cell, TRP, and/or beam to satisfy the above-described various service requirements.

Joint transmission (JT) is a representative transmission technique for the coordinated communication may increase the strength of the signal received by the UE by supporting one UE using a different cell, TRP and/or beam through the above technique. On the other hand, since channels between each cell, TRP and/or beam and a UE may have greatly different characteristics, different precoding, MCS, resource allocation, and the like need to be applied to links between each cell, TRP and/or beam and the UE. Specifically, in the case of non-coherent joint transmission (NC-JT), which supports non-coherent precoding between each cell, TRP and/or beam, individual DL transmission information configuration for each cell, TRP and/or beam becomes important. Meanwhile, such individual DL transmission information configuration for each cell, TRP and/or beam is a major factor in increasing payload required for DL DCI transmission, which adversely affects the reception performance of a physical downlink control channel (PDCCH) for transmitting DCI. Therefore, it is necessary to carefully design tradeoff between DCI information quantity and PDCCH reception performance for JT support.

Figure 10:
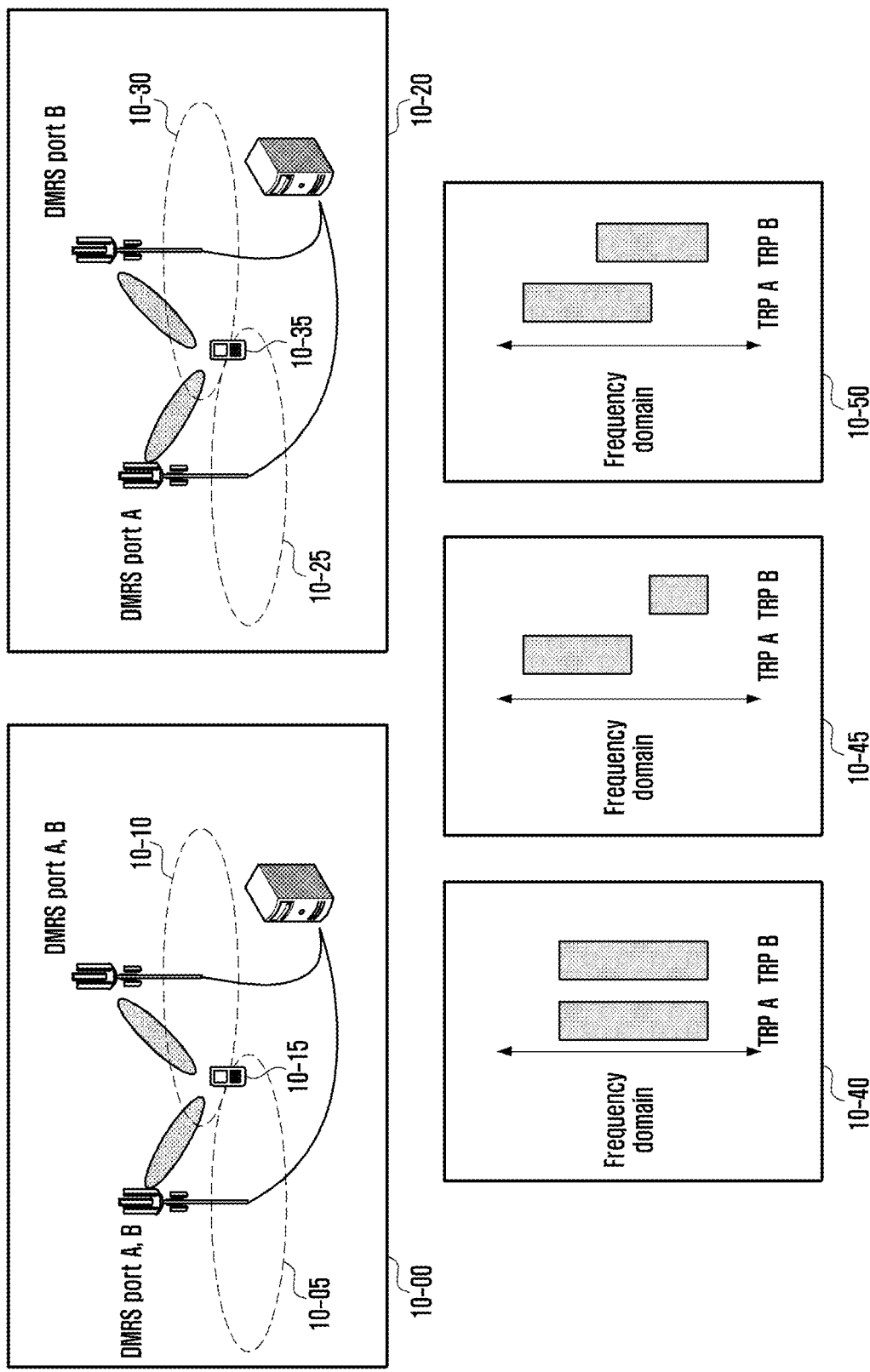
FIG. 10 illustrates a diagram of a joint transmission (JT) technique and radio resource allocation examples for each TRP in accordance with a situation according to an embodiment of the disclosure.

FIG. 10 illustrates a diagram of a JT technique and radio resource allocation examples for each TRP in accordance with a situation according to an embodiment of the disclosure.

In FIG. 10, 10-00 illustrates a diagram of coherent joint transmission (C-JT) supporting coherent precoding between each cell, TRP and/or beam. In C-JT, the same data (PDSCH) is transmitted in a TRP A 10-05 and a TRP B 10-10, and joint precoding is performed in a plurality of TRPs. This means that the same DMRS port (e.g., DMRS ports A and B in two TRPs) for the same PDSCH reception is transmitted in the TRP A 10-05 and the TRP B 10-10. In this case, a UE will receive one piece of DCI information for receiving one PDSCH demodulated by the DMRS ports A and B.

In FIG. 10, 10-20 illustrates a diagram of non-coherent joint transmission (NC-JT) supporting non-coherent precoding between each cell, TRP and/or beam. In the NC-JT, different PDSCHs are transmitted in each cell, TRP and/or beam and individual precoding may be applied to each PDSCH. This means different DMRS ports (e.g., DMRS port A in TRP A and DMRS port B in TRP B) for different PDSCH reception are transmitted in a TRP A 10-25 and a TRP B 10-30. In this case, a UE will receive two types of DCI information for receiving a PDSCH A demodulated by DMRS port A and a PDSCH B demodulated by another DMRS port B.

For example, in the case of NC-JT, as in cases where frequency and time resources used by multiple TRPs are the same according to FIG. 5B (10-40), where the frequency and time resources used by multiple TRPs do not overlap each other at all (10-45), or where some of frequency and time resources used by multiple TRPs overlap each other (10-50), it is possible to consider various radio resource allocations. In particular, in the case of 10-50, it can be seen that a DCI payload required for resource assignment information increases linearly in the number of TRPs. Such an increase in the DL DCI payload may adversely affect the reception performance of a PDCCH for transmitting DCI or may significantly increase the DCI blind decoding complexity of the UE as described above. Therefore, the disclosure provides a PDSCH time and frequency resource allocation method for efficiently supporting NC-JT.

Various forms, structures, and relations of DCIs may be considered to allocate a plurality of PDSCHs simultaneously to one UE for NC-JT support.

Figure 11:
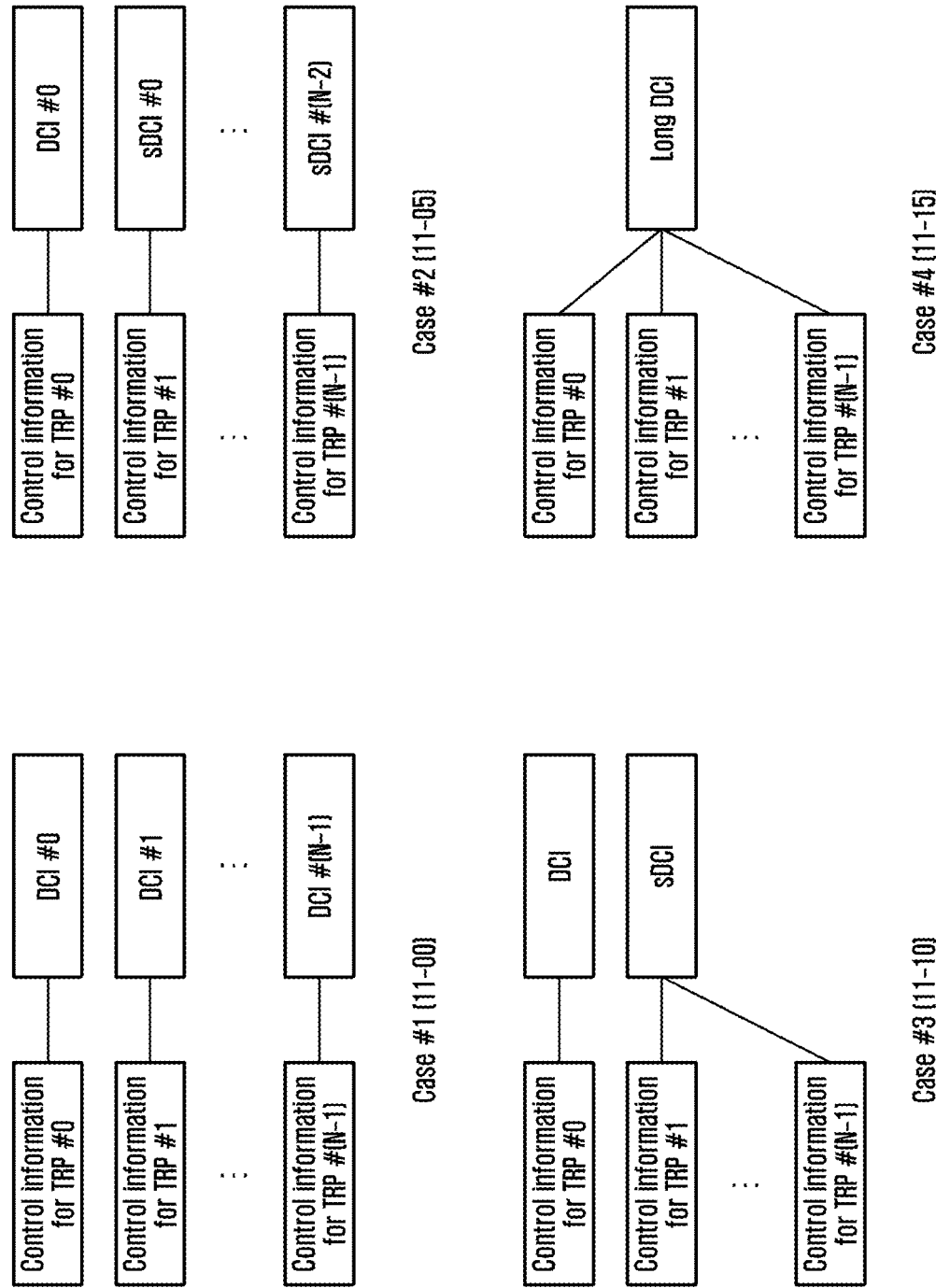
FIG. 11 illustrates a diagram of four examples of DCI design for NC-JT support according to an embodiment of the disclosure.

FIG. 11 illustrates a diagram of four examples of DCI design for NC-JT support according to an embodiment of the disclosure.

In FIG. 11, case #1 11-00 illustrates an example in which, in a situation where different (N−1) PDSCHs are transmitted in (N−1) additional TRPs (TRP #1 to TRP #(N−1)) other than a serving TRP (TRP #0) used when a single PDSCH is transmitted, control information for a PDSCH transmitted in the additional TRP is transmitted in the same DCI format as control information for a PDSCH transmitted in the serving TRP. That is, a UE obtains the control information for the PDSCHs transmitted in the different TRPs (TRP #0 to TRP #(N−1)) through DCIs (DCI #0 to DCI #(N−1)) all having the same DCI format and the same payload. The case #1 has an advantage in that the degree of freedom for each PDSCH control (assignment) is completely guaranteed, but when each DCI is transmitted in a different TRP, a coverage difference for each DCI may occur, thereby degrading the reception performance.

In FIG. 11, case #2 11-05 illustrates an example in which, in a situation where different (N−1) PDSCHs are transmitted in (N−1) additional TRPs (TRP #1 to TRP #(N−1)) other than a serving TRP (TRP #0) used when a single PDSCH is transmitted, control information for a PDSCH transmitted in the additional TRP is transmitted in a different DCI format or a different DCI payload from control information for a PDSCH transmitted in the serving TRP. In the case of DCI #0 where the control information for the PDSCH transmitted in the serving TRP (TRP #0) is transmitted, the DCI #0 includes all information elements of the DCI format 1_0 to the DCI format 1_1. However, in the case of "shortened" DCIs (sDCI #0 to sDCI #(N−2)) transmitting the control information on the PDSCHs transmitted in coordinated TRPs (TRP #1 to TRP #(N−1)), the "shortened" DCIs may include only some pieces of information elements of the DCI format 1_0 to the DCI format 1_1. Therefore, in case of sDCI transmitting the control information on the PDSCHs transmitted in the coordinated TRP, the sDCI may have a small payload compared to a normal DCI (nDCI) transmitting PDSCH-related control information transmitted in the serving TRP, or may include reserved bits by the number of missing bits compared to nDCI. The case #2 has a disadvantage in that the degree of freedom of each PDSCH control (assignment) may be limited according to the contents of the information element included in the sDCI. However, since the reception performance of the sDCI is superior to that of the nDCI, there is an advantage in that the probability of occurrence of coverage difference for each DCI is lowered.

In FIG. 11, case #3 11-10 illustrates another example in which, in a situation where different (N−1) PDSCHs are transmitted in (N−1) additional TRPs (TRP #1 to TRP #(N−1)) other than a serving TRP (TRP #0) used when a single PDSCH is transmitted, control information for a PDSCH transmitted in the additional TRP is transmitted in a different DCI format or a different DCI payload from control information for a PDSCH transmitted in the serving TRP. For example, in the case of DCI #0 where the control information for the PDSCH transmitted in the serving TRP (TRP #0) is transmitted, the DCI #0 includes all information elements of the DCI format 1_0 to the DCI format 1_1. In a case of the control information for the PDSCHs transmitted in the coordinated TRP (TRP #1 to TRP #(N−1)), only some pieces of information elements of the DCI format 1_0 to the DCI format 1_1 may be gathered in one "secondary" DCI (sDCI) and transmitted. For example, the sDCI may have at least one piece of HARQ-related information such as frequency domain resource assignment, time domain resource assignment, MCS, etc., of the coordinated TRPs. In addition, in case of information that is not included in the sDCI such as a BWP indicator or a carrier indicator, it is possible to follow DCI (DCI #0, normal DCI, or nDCI) of serving TRP. The case #3 has a disadvantage in that the degree of freedom of each PDSCH control (assignment) may be limited according to the contents of the information element included in the sDCI, but has an advantage in that the reception performance of the sDCI can be adjusted and the DCI blind decoding complexity of the UE may be reduced compared to the case #1 or the case #2.

In FIG. 11, case #4 11-15 illustrates another example in which, in a situation where different (N−1) PDSCHs are transmitted in (N−1) additional TRPs (TRP #1 to TRP #(N−1)) other than a serving TRP (TRP #0) used when a single PDSCH is transmitted, control information on the PDSCH transmitted in the additional TRP is transmitted in DCI (long DCI (lDCI)) as in the control information on the PDSCH transmitted in the serving TRP. That is, the UE acquires control information on the PDSCHs transmitted in different TRPs (TRP #0 to TRP #(N−1)) through a single DCI. The case #4 has an advantage in that the complexity of DCI blind decoding of the UE does not increase, but has a disadvantage in that the degree of freedom for the PDSCH control (allocation) is lowered, such as limited number of coordinated TRPs due to long DCI payload restriction.

In the following description and embodiments, the sDCI may refer to various secondary DCIs such as a shortened DCI, a secondary DCI, or a normal DCI (DCI format 1_0 to 1_1 described above) including the PDSCH control information transmitted in the coordinated TRP. Here, if a particular limitation is not specified, the description is similarly applicable to the various auxiliary DCIs.

In the following description and embodiments, the cases #1, #2, and #3 in which one or more DCIs (PDCCHs) are used for NC-JT support are divided into multiple PDCCH-based NC-JTs. The case #4, in which a single DCI (PDCCH) is used for NC-JT support, is divided into a single PDCCH-based NC-JT.

The following description and embodiments provide detailed allocation methods of time and frequency resources for the multiple PDCCH-based and single PDCCH-based NC-JTs.

In the embodiments of the disclosure, "coordinated TRP" may be replaced with various terms such as "coordinated panel" or "coordinated beam" in actual application.

In the embodiments of the disclosure, "when NC-JT is applied" can be interpreted in various ways according to situations such as "when a UE receives one or more PDSCHs at the same time in one BWP", "when a UE receives the PDSCH based on two or more TCI indications at the same time in one BWP", "when the PDSCH received by the UE is associated with one or more DMRS port groups", or the like, but it is used as one expression for convenience of description.

In the disclosure, a radio protocol structure for NC-JT may be used in various ways according to a TRP deployment scenario. For example, if there is no backhaul delay between coordinated TRPs or there is a small backhaul delay therebetween, it is possible to use a structure based on MAC layer multiplexing similar to 9-10 of FIG. 9 (CA-like method). On the other hand, if the backhaul delay between the coordinated TRPs is large which is not negligible (e.g., if time of 2 ms or more is required for CSI exchange or scheduling information exchange between the coordinated TRPs), it is possible to secure characteristics that are robust to delay using an independent structure for each TRP starting from the RLC layer (DC-like method) as in 9-20 of FIG. 9.

Second Embodiment: FD-RA for NC-JT

In this embodiment, a frequency domain resource allocation (FD-RA) method considering NC-JT will be described.

According to the above description, the number of bits for a conventional single PDSCH FD-RA may require payload of 15 bits or more according to the number of PRBs in a BWP. When simply extending the number of bits for the conventional single PDSCH FD-RA, the number of FD-RA payloads required when N>1 PDSCHs are allocated for NC-JT may be 15*N bits or more, which may be a heavy load on DCI transmission.

To solve this problem, when using the same FD-RA payload as that of release 15 NR in one PDCCH, the following methods can be used:

Method 1: In case of type 0 indicating whether to allocate a resource for a corresponding band through a bitmap for a predetermined RB group (RBG), it is possible to promise to change the size of the RBG according to the number of PDSCHs allocated by the corresponding PDCCH. The number of PDSCHs allocated by the corresponding PDCCH may be indicated to the UE by various methods such as being explicitly indicated by a specific field value in a DCI transmitted by the corresponding PDCCH, or being implicitly determined based on a TCI state within the DCI transmitted by the corresponding PDCCH or the number of pieces or state of QCL information (e.g., according to how many pieces of QCL information are included/indicated).

TABLE 7

| Bandwidth Part Size | Configuration 1 | | Configuration 2 | |
|---|---|---|---|---|
| | Cond. A (Single PDSCH) | Cond. B (Two PDSCH) | Cond. A (Single PDSCH) | Cond. B (Two PDSCH) |
| 1-36 | 2 | 4 | 4 | 8 |
| 37-72 | 4 | 8 | 8 | 16 |
| 73-144 | 8 | 16 | 16 | 32 |
| 145-275 | 16 | 32 | 16 | 32 |

Table 7 shows an example of a method of determining an RBG size according to the number of PRBs included in a BWP when the maximum number of PDSCHs that can be allocated by a UE through one PDSCH is 2 by UE capability signaling of a UE and higher layer configuration of an eNB. Referring to Table 7, when it is determined by the above condition or method that the number of PDSCHs allocated by an arbitrary DCI is one (condition A), one of {2, 4, 8, 16} or {4, 8, 16, 16} is used according to higher layer configuration (configuration 1 or configuration 2) of the eNB. On the other hand, if it is determined by the above condition or method that the number of PDSCHs allocated by an arbitrary DCI is 2 (condition B), the RBG size is doubled compared to a single PDSCH situation according to the higher layer configuration (configuration 1 or configuration 2) of the eNB, thereby using one of {4, 8, 16, 32} or {8, 16, 32, 32}. Through this, FD-RA may be performed on up to two PDSCHs without increasing the conventional FD-RA payload. The above method can be similarly extended even if an arbitrary DCI can allocate three or more PDSCHs. In this method, all FD-RA bits are divided into subgroups according to the number of allocated PDSCHs and may be mapped to each PDSCH according to a TCI state (or QCL information) signaling order in a corresponding DCI.

Figure 18:
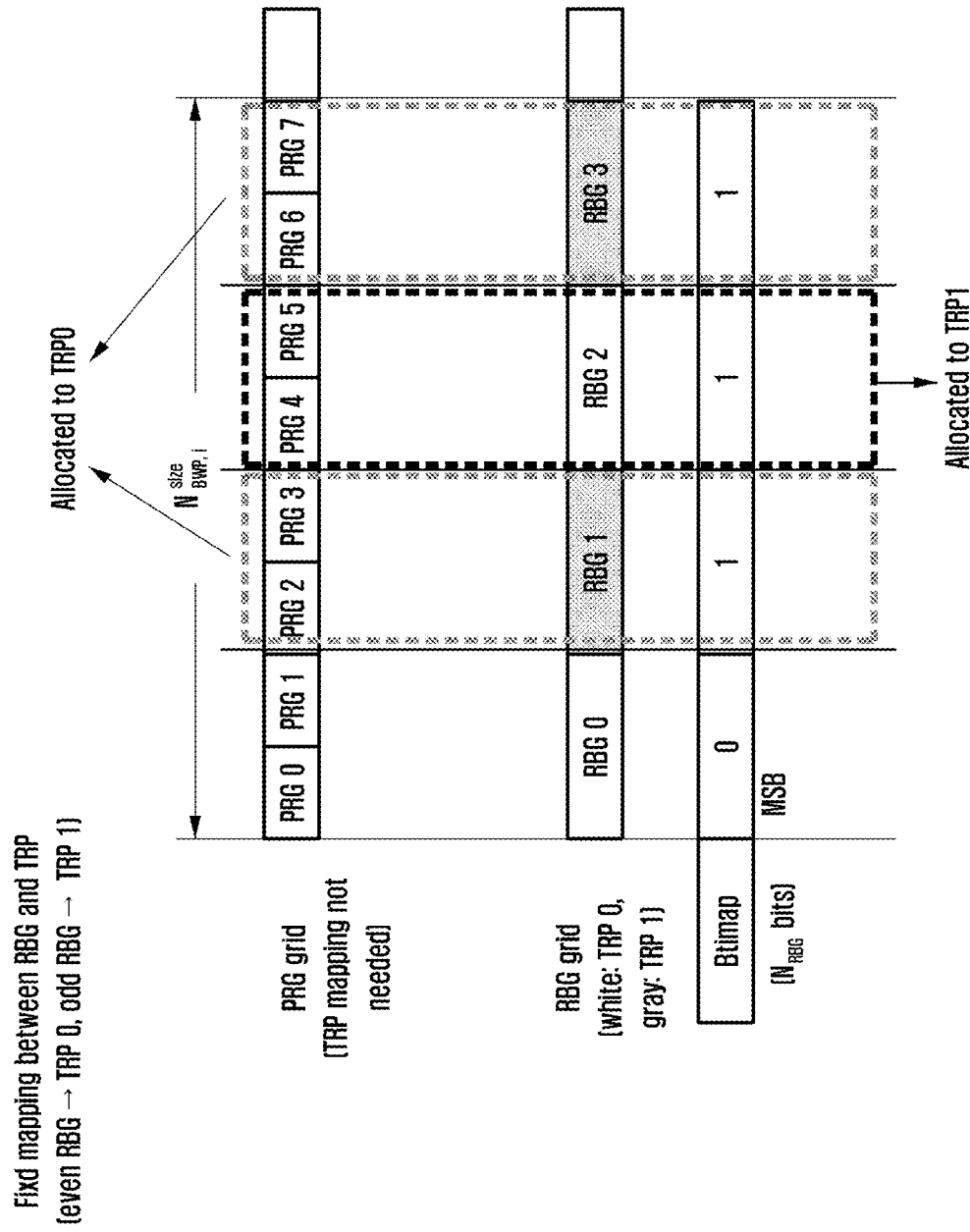
FIG. 18 illustrates a diagram of examples of a relationship between RBG and TRP and a bitmap for RBG allocation according to an embodiment of the disclosure.

Method 1-1: For the RBG, it is possible to assume fixed TRP allocation per RBG. For example, in the resource allocation for n RBGs in a BWP, i.e., $RBG_0, \ldots, RBG_{n-1}$, even-numbered RBGs, for example, $RBG_0$, $RBG_2, \ldots$, may be designated for the use in TRP 0 and odd-numbered RBGs, for example, $RBG_1$, $RBG_3, \ldots$, may be designated for the use in TRP 1. Which RBG among the RBGs is allocated to the UE may be indicated by an RBG bitmap in the above-described DCI, and the corresponding RBG bitmap size may be equal to that of release 15 NR. An example of a relationship between RBG and TRP and a bitmap for RBG allocation is shown in FIG. 18. The above method can be similarly extended even if an arbitrary DCI can allocate three or more PDSCHs.

If a larger FD-RA payload than that of release 15 NR is used in one PDCCH, the following methods may be used:

Method 2: For FD-RA type 0 or type 1, it is possible to promise to change the FD-RA payload size according to the number of PDSCHs allocated by the corresponding PDCCH. The number of PDSCHs allocated by the corresponding PDCCH may be indicated to the UE by various methods such as being explicitly indicated by a specific field value in a DCI transmitted by the corresponding PDCCH, or being implicitly determined based on a TCI state within the DCI transmitted by the corresponding PDCCH or the number of pieces or state of QCL information (e.g., according to how many pieces of QCL information are included/indicated). In this method, the RBG size according to the number of PRBs included in the BWP is used in the same manner as in the prior art, and different FD-RAs are performed on different PDSCHs by linearly increasing the FD-RA payload according to the maximum number of PDSCHs that the UE can be allocated through one PDSCH by UE capability signaling of the UE and higher layer configuration of the eNB. In this case, the entire FD-RA bits are divided into subgroups according to the number of allocated PDSCHs and can be mapped to each PDSCH according to the TCI state (or QCL information) signaling order in the corresponding DCI.

Method 3: In the case of type 0 indicating whether to allocate a resource for a corresponding band through a bitmap for a predetermined RB group (RBG), it is possible to select an additional RBG configuration according to the number of PDSCHs allocated by the corresponding PDCCH. The number of PDSCHs allocated by the corresponding PDCCH may be indicated to the UE by various methods such as being explicitly indicated by a specific field value in a DCI transmitted by the corresponding PDCCH, or being implicitly determined based on a TCI state within the DCI transmitted by the corresponding PDCCH or the number of pieces or state of QCL information (e.g., according to how many pieces of QCL information are included/indicated).

TABLE 8

| Bandwidth Part Size | Configuration 1 Cond. A (Single PDSCH) | Configuration 2 Cond. A (Single PDSCH) | Configuration 3 Cond. B (Multiple PDSCHs) | |
|---|---|---|---|---|
| 1-36 | 2 | 4 | 4 | ... |
| 37-72 | 4 | 8 | 8 | ... |
| 73-144 | 8 | 16 | 16 | ... |
| 145-275 | 16 | 16 | 32 | ... |

Table 8 shows an example of a method of determining an RBG size according to the number of PRBs included in a BWP when the maximum number of PDSCHs that can be allocated by a UE through one PDSCH is two or more by UE capability signaling and higher layer configuration of the eNB. Referring to Table 8, when it is determined by the above condition or method that the number of PDSCHs allocated by an arbitrary DCI is one (condition A), one of {2, 4, 8, 16} or {4, 8, 16, 16} is used according to higher layer configuration (configuration 1 or configuration 2) of the eNB. On the other hand, if it is determine by the above condition or method that the number of PDSCHs allocated by an arbitrary DCI is two (condition B), one among newly determined RBG sizes ({4, 8, 16, 32} . . . in this example) is used according to higher layer configuration (configuration 3 or configuration 4 or . . . ) of the eNB. Through this, FD-RA may be performed on two or more PDSCHs while appropriately increasing the conventional FD-RA payload. In this method, all FD-RA bits are divided into subgroups according to the number of allocated PDSCHs and may be mapped to each PDSCH according to TCI state (or QCL information) signaling order in a corresponding DCI.

Figure 12:
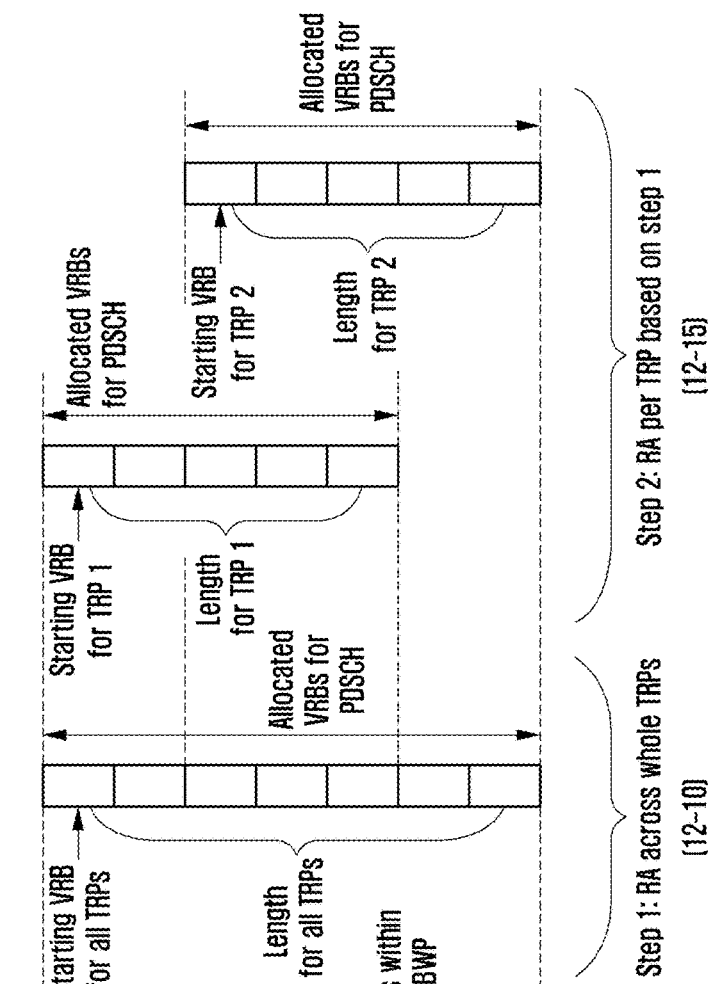
FIG. 12 illustrates a diagram of an example of a stepwise FD-RA according to an embodiment of the disclosure.
Figure 12:
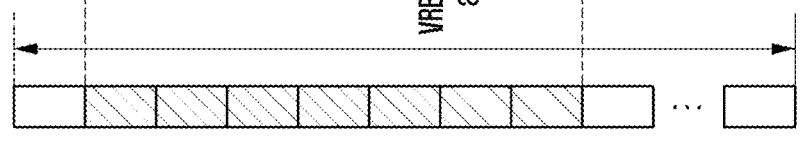
Figure 12:
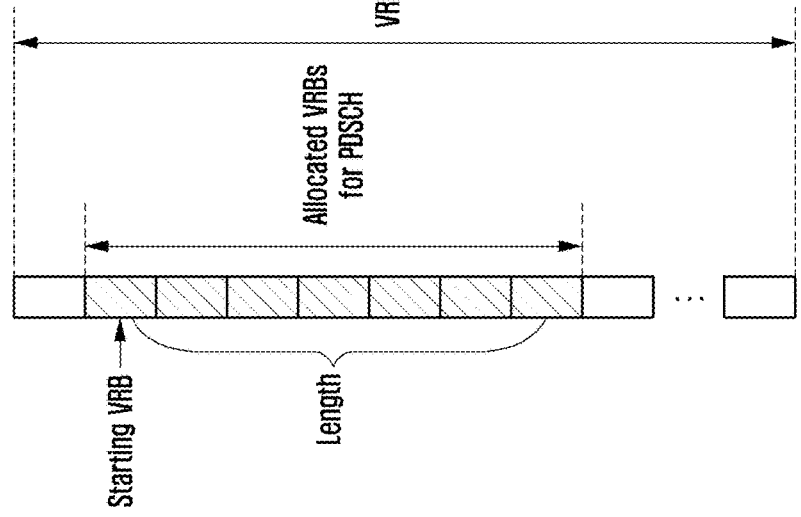

Method 4: In case of type 1 of informing resource allocation information through the start position of the VRB and the allocated VRB length, it is possible to reduce the FD-RA payload for multiple PDSCHs by introducing a stepwise FD-RA. FIG. 12 illustrates a diagram of an example of a stepwise FD-RA according to an embodiment of the disclosure. Referring to FIG. 12, it is possible to select an FD-RA method having different steps according to the number of PDSCHs allocated by the corresponding PDCCH. The number of PDSCHs allocated by the corresponding PDCCH may be indicated to the UE by various methods such as being explicitly indicated by a specific field value in a DCI transmitted by the corresponding PDCCH, or being implicitly determined based on a TCI state within the DCI transmitted by the corresponding PDCCH or the number of pieces or state of QCL information (e.g., according to how many pieces of QCL information are included/indicated). Referring to FIG. 12, when the number of PDSCHs allocated by the corresponding PDCCH is one, frequency resources may be allocated through FD-RA 12-00 having a single step. On the other hand, if there are two or more PDSCHs allocated by the corresponding PDCCH, it is possible to allocate frequency resources through the FD-RA 12-05 having two steps. In the two-step FD-RA 12-05, the first step 12-10 indicates information on the union of frequency domain resources occupied by a plurality of PDSCHs based on starting VRB and length. In the two-step FD-RA 12-05, the second step 12-15 sequentially indicates information on each frequency domain resource occupied by the plurality of PDSCHs based on starting VRB and length. At this time, the payload required in each step is the same as Equation 1 in the first step 12-10 and is the same as Equation 2 in the second step. In Equation 1, $N_{RB}^{DL,BWP}$ denotes the number of PRBs within a BWP indicated by the DCI within the corresponding PDCCH. In Equation 2, $N_{RB}^{DL,Step\ 1}$ denotes the VRB length indicated in the first step 12-10 and denotes the number of PDSCHs allocated by the corresponding DCI. In FIG. 12, the VRBs are illustrated as being composed of consecutive PRBs, but this is for convenience of description and it should be noted that mapping with the actual PRBs may be variously changed according to a predetermined rule.

$$\left\lceil \log_2\left(\frac{N_{RB}^{DL,BWP}(N_{RB}^{DL,BWP}+1)}{2}\right)\right\rceil \quad \text{[Equation 1]}$$

-continued
$$\left\lceil \log_2\left(\frac{N_{RB}^{DL,Step\ 1}(N_{RB}^{DL,Step\ 1}+1)}{2}\times N\right)\right\rceil \quad \text{[Equation 2]}$$

The methods 1 to 4 according to this embodiment are not mutually exclusive and may be cross supported depending on conditions. For example, it may be promised to use method 1 for FD-RA type 0 and to use method 4 for FD-RA type 1. Various other combinations are possible, but not all possibilities are listed in order not to obscure the point of explanation.

In the case of type 1 which informs the resource assignment information through the start position of the VRB and the allocated VRB length, the FD-RA payload is already compressed in a form that indicates the index of the available VRB start position and length combination, so that it is significantly difficult to contain additional information when the conventional FD-RA payload is maintained. Thus, the UE may have a DCI indicating an NC-JT operation, that is, allocating one or more PDSCHs to at least one or more identical OFD symbols which may have the same FD-RA payload as the FD-RA payload of release 15 NR, and when the type 1 FD-RA is used, it is possible to promise to understand that the corresponding DCI allocates the same FD-RA to all the one or more PDSCHs.

Third Embodiment: TD-RA for NC-JT

In this embodiment, a time domain resource allocation (TD-RA) method considering NC-JT will be described.

According to the above description, the number of bits for a conventional single PDSCH TD-RA may be possible from 0 to 4 bits according to a configuration, and if the number of bits is simply expanded, the number of FD-RA payloads required when N>1 PDSCHs are allocated for NC-JT may be 4*N or more. This is not a big increase compared to FD-RA, but TD-RA requires careful design because it is intertwined with various issues such as DMRS RE pattern, PDCCH monitoring occasion, PDSCH RE mapping, channel estimation, control channel load balancing, and the like.

In consideration of the above problems, it is possible to use at least one of the following three methods for SLIV and PDSCH mapping types among information included in the TD-RA.

Method 1: In this method, when a UE simultaneously receives two or more PDSCHs sharing at least some time and frequency resources, in order to reduce implementation complexity for interference management including interference measurement and interference cancellation between two or more PDSCHs, both SLIV and PDSCH mapping types for two or more PDSCHs are matched. In this case, since the UE can be guaranteed the same RE pattern for all PDSCHs to be received simultaneously, an NC-JT reception operation including the interference management is simplified. At this time, in order to ensure simplicity of the implementation complexity of the UE, "when the two or more PDSCHs sharing the at least some time and frequency resources are allocated to have different SLIV values or different PDSCH mapping type values, all the PDSCHs are not received, or "when the two or more PDSCHs sharing the at least some time and frequency resources are allocated to have different SLIV values or different PDSCH mapping type values, it is possible to promise to receive only the PDSCH having the highest priority among the PDSCHs". In this case, the priorities among the PDSCHs may be determined by various methods such as a PDSCH having the smallest k0 value, a PDSCH having the smallest TCI state ID, or a PDSCH having the smallest HARQ process ID.

Figure 13:
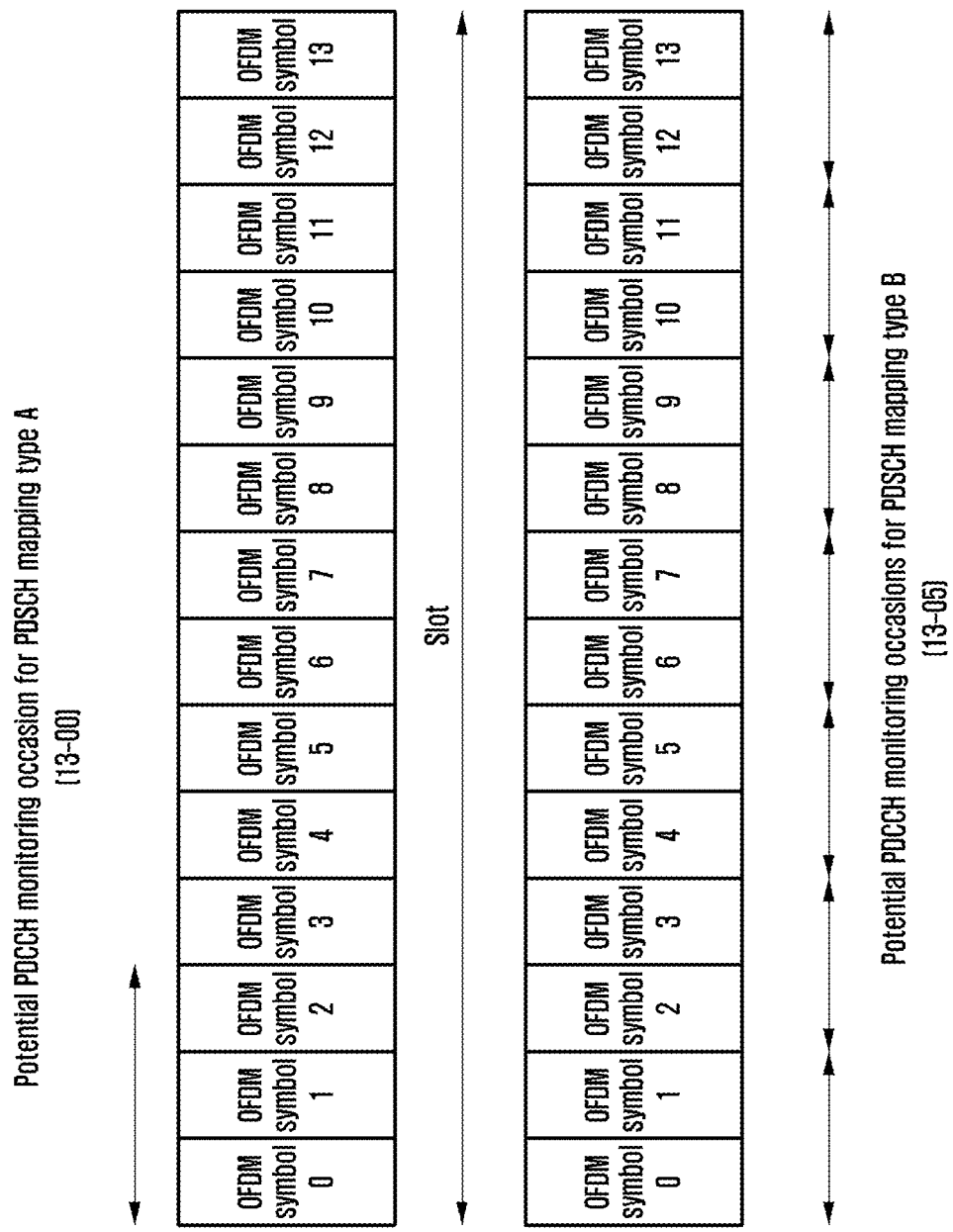
FIG. 13 illustrates a diagram of a PDCCH monitoring occasion in accordance with a PDSCH mapping type according to an embodiment of the disclosure.

Method 2: In this method, when a UE simultaneously receives two or more PDSCHs sharing at least some time and frequency resources, in order to reduce UE implementation complexity and to distribute the PDCCH transmission load of the eNB (PDCCH load balancing), the SLIV values for the two or more PDSCHs are matched, but the PDSCH mapping type can be allowed to have different values. FIG. 13 illustrates a diagram of a PDCCH monitoring occasion in accordance with a PDSCH mapping type according to an embodiment of the disclosure. Referring to FIG. 13, in a case of PDSCH mapping type A, only up to a first third OFDM symbol in a slot may be designated as a PDCCH monitoring occasion (13-00), whereas in a case of PDSCH mapping type B, all OFDM symbols in a slot may be designated as a PDCCH monitoring occasion (13-05). This means that PDSCH mapping types of NC-JT PDSCHs may be properly allocated according to network traffic load, thereby preventing PDCCH transmission from being collected in some symbols in the slot. This method is particularly suitable for multiple PDCCH-based NC-JTs requiring two or more PDCCH transmissions for NC-JT allocation. In this case, in order to ensure the implementation complexity of the UE, "when the two or more PDSCHs sharing the at least some time and frequency resources are allocated to have different SLIV values, all the PDSCHs are not received, or "when the two or more PDSCHs sharing the at least some time and frequency resources are allocated to have different SLIV values, it is possible to promise to receive only the PDSCH having the highest priority among the PDSCHs". In this case, the priorities among the PDSCHs may be determined by various methods such as a PDSCH having the smallest k0 value, a PDSCH having the smallest TCI state ID, or a PDSCH having the smallest HARQ process ID.

Method 3: In this method, when a UE simultaneously receives two or more PDSCHs sharing at least some time and frequency resources, in order to maximize the degree of scheduling freedom and throughput performance, there is no restriction on the SLIV value and the PDSCH mapping type for the two or more PDSCHs. In this case, DMRS RE patterns in the two or more PDSCHs may not match, and the DMRS channel estimation performance may deteriorate due to collision between the DMRS RE of one PDSCH and the PDSCH RE of another PDSCH. In order to solve this, if the SLIV values or PDSCH mapping types for the two or more PDSCHs are different, it is necessary to perform rate matching on PDSCH REs located in DMRS REs of other PDSCHs. For this purpose, if the SLIV values or PDSCH mapping types for the two or more PDSCHs are different, the UE may "receive one additional SLIV value and may perform PDSCH RE rate matching on the DMRS RE position determined by associating the additional SLIV value with the conventional DMRS port and CDM group without data indication information", or "perform PDSCH RE rate matching on the DMRS RE position determined by associating a pair of additional DMRS port number indication information and the additional SLIV value", or "perform PDSCH RE rate matching based on signaling informing whether PDSCH RE rate matching in units of symbols is applied", or "perform PDSCH RE rate matching based on an RE-level rate matching signal of release 15 NR, whereby it may be guaranteed not to perform an additional operation (for example, PDSCH interference cancellation (successive interference cancellation) in the DMRS RE) when the DMRS channel estimation for the NC-JT PDSCH demodulation is performed.

In consideration of the above problems, it is possible to use at least one of the following two methods for k0 of information included in the TD-RA.

Figure 14:
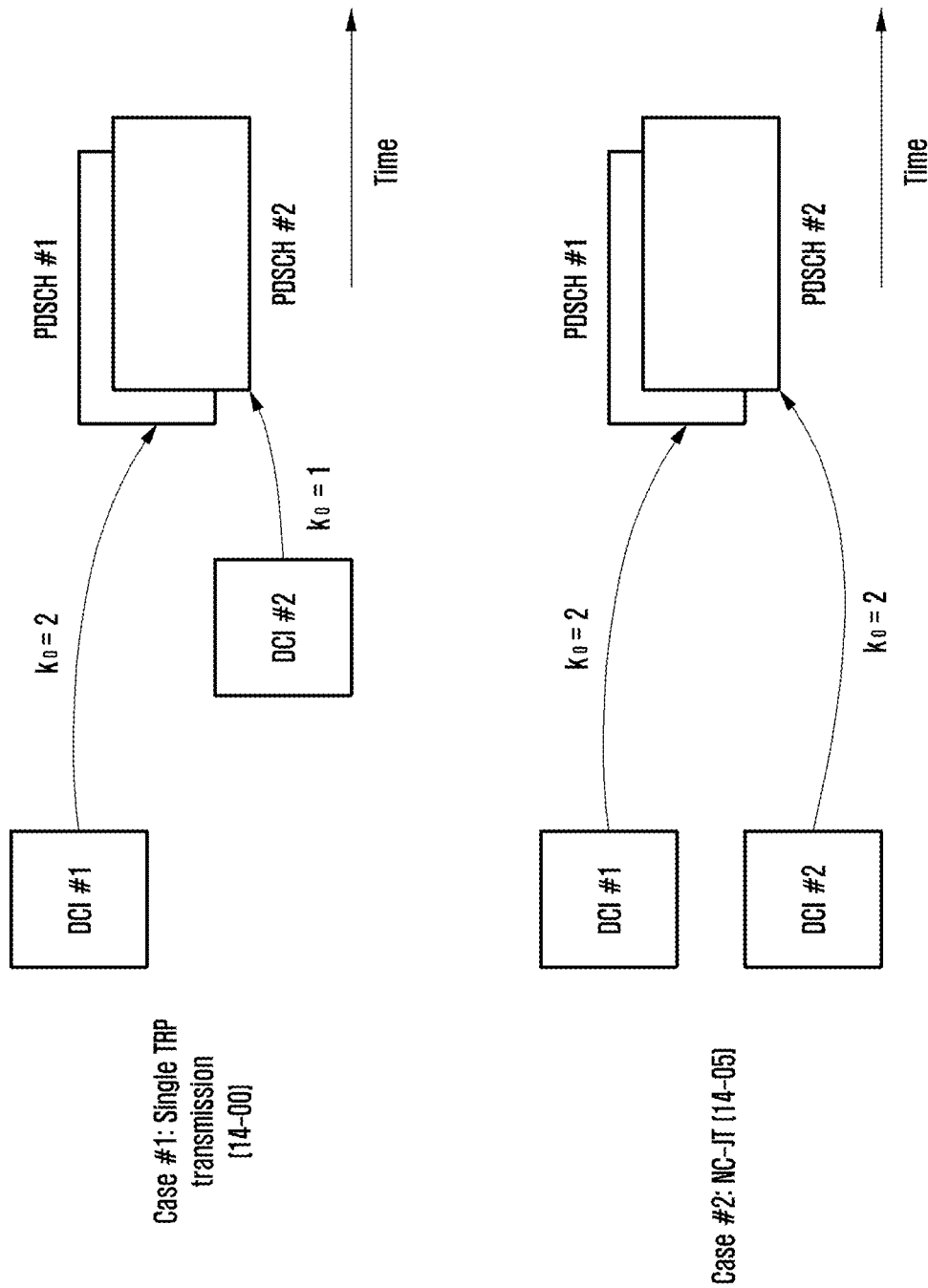
FIG. 14 illustrates a diagram of a method of monitoring two or more PDSCHs according to an embodiment of the disclosure.

Method 4: In this method, when a UE simultaneously receives two or more PDSCHs sharing at least some time and frequency resources, in order to reduce the implementation complexity of processing time management and PDSCH dropping rule for preparation of the two or more PDSCH reception, all k0 values of the two or more PDSCHs are matched. In this case, since the UE can be guaranteed the same processing time for all PDSCHs to be received simultaneously, pipeline management for NC-JT PDSCH reception is simplified. In this case, in order to ensure the simplicity of implementation complexity of the UE, for example, "NC-JT capable UE can be allocated with up to 2 (or >2 per the UE capability signaling) PDSCHs on the same OFDM symbol(s), if the k0 values of all the PDSCHs are identical. Otherwise, the UE may assume that the PDSCH with the minimum k0 value is allocated on that OFDM symbol (s) only" may be promised. FIG. 14 illustrates a diagram of a brief example of the above description, and illustrates a diagram of a method of monitoring two or more PDSCHs according to an embodiment of the disclosure. Referring to FIG. 14, in a case where two different PDSCHs share at least partially identical time and frequency resources, if the k0 values of these two PDSCHs are different, a UE considers this as a single TRP transmission and performs an operation corresponding thereto (e.g., receiving only one PDSCH of the highest priority) at 14-00. On the other hand, in a case where allocated different two PDSCHs share at least partially identical time and frequency resources, if the k0 values of these two PDSCHs are the same, the UE considers this as an NC-JT transmission and performs an operation corresponding thereto (e.g., receiving all the corresponding PDSCHs) at 14-05.

Method 5: In this method, when a UE simultaneously receives two or more PDSCHs sharing at least some of time and frequency resources, in order to reduce the implementation complexity of processing time management and PDSCH dropping rule for preparation of the two or more PDSCH reception, all k0 values of the two or more PDSCHs are matched. It is possible to place a threshold on a difference between the k0 values for the two or more PDSCHs. The threshold value(s) may be predetermined but may be known to the UE through higher layer signaling. That is, if the two or more PDSCHs sharing some of time and frequency resources are allocated by DCIs transmitted within a given time interval, the UE determines this as NC-JT. In this case, in order to ensure the simplicity of implementation complexity of the UE, for example, "NC-JT capable UE can be allocated with up to 2 (or >2) PDSCHs on the same OFDM symbol(s), if the value of $|\max k_0 - \min k_0|$ for all the PDSCHs are less than given threshold. Otherwise, UE may assume that the PDSCH with the minimum k0 value is allocated on that OFDM symbol(s) only." may be promised. Specifically, in a case where two different PDSCHs share at least partial identical time and frequency resources, if a difference between the k0 values of the two PDSCHs is greater than the threshold value, the UE considers this as a single TRP transmission and performs an operation corresponding thereto (e.g., receiving only one PDSCH having the highest priority). On the other hand, in a case where allocated different two PDSCHs share at least partially identical time and frequency resources, if a difference between the k0 values of the two PDSCHs is smaller than the threshold value, the UE considers this as NC-JT transmission and performs an operation corresponding thereto (e.g., receiving all the corresponding PDSCHs).

Figure 15:
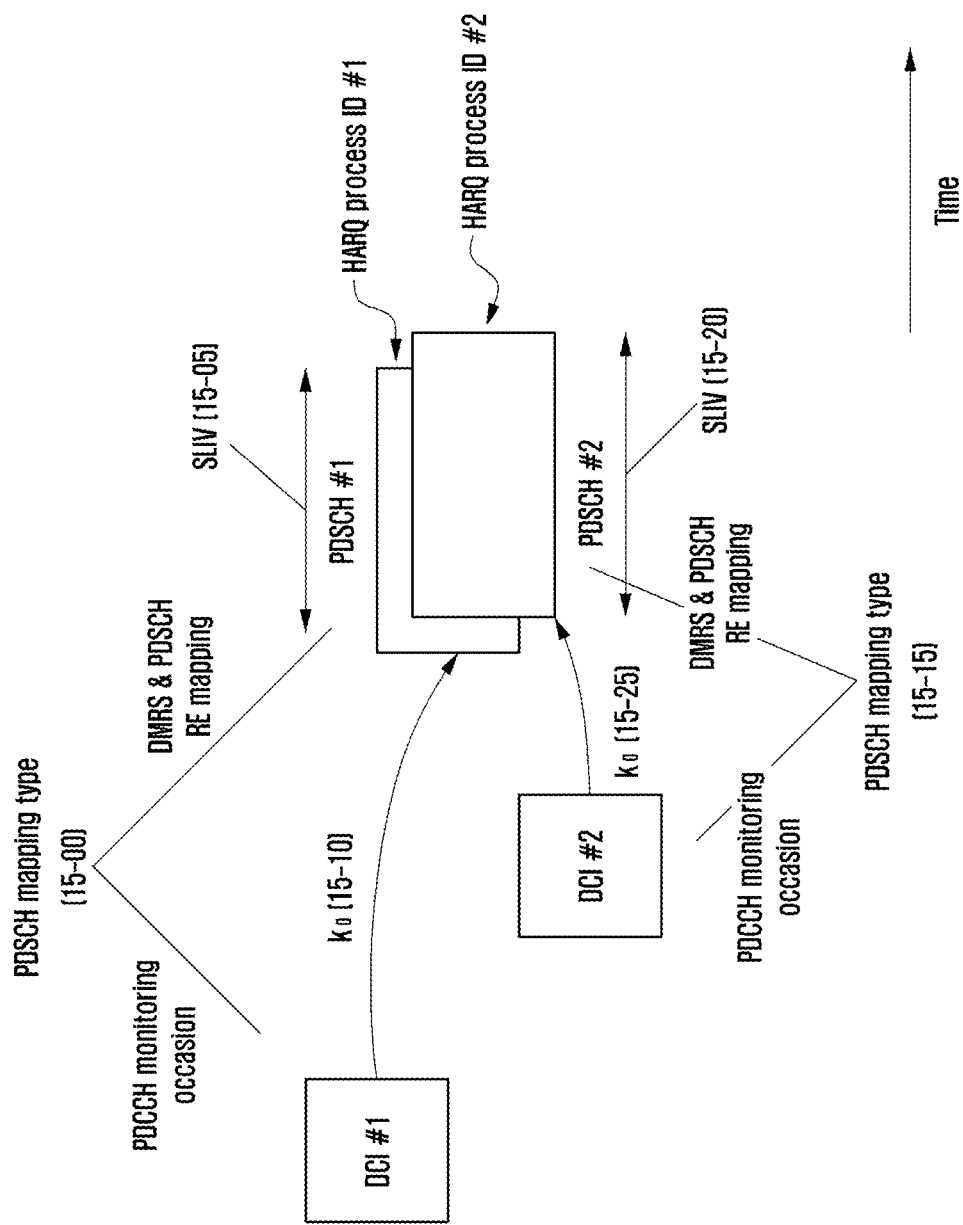
FIG. 15 illustrates a diagram of another example of a method of monitoring two or more PDSCHs according to an embodiment of the disclosure.

Method 6: In this method, when a UE simultaneously receives two or more PDSCHs sharing at least some of time and frequency resources, in order to reduce the implementation complexity of processing time management and PDSCH dropping rule for preparation of the two or more PDSCH reception, it is possible to determine whether NC-JT is applied based on HARQ process ID values for the two or more PDSCHs. As an example, FIG. 15 illustrates a diagram of another example of a method of monitoring two or more PDSCHs according to an embodiment of the disclosure. Referring to FIG. 15, when two or more PDSCHs sharing some time and frequency resources are allocated to have different (same) HARQ process IDs, a UE considers this as an NC-JT transmission and performs an operation corresponding thereto (e.g., receiving all the corresponding PDSCHs). On the other hand, when the two or more PDSCHs are allocated to have different (same) HARQ process IDs, the UE considers this as a single TRP transmission and performs an operation corresponding thereto (e.g., receiving only one PDSCH having the highest priority).

In this embodiment, the methods 1 to 6 are not mutually exclusive, and one or more methods may be combined and used depending on conditions. For example, the method 1 may be applied to the SLIV and the PDSCH mapping types, and the method 4 may be applied to the k0 value. Various other combinations are possible, but not all possibilities are listed in order not to obscure the point of explanation.

Fourth Embodiment: UE Capability Signaling for NC-JT Reception and Resource Allocation Method Thereof In this embodiment, a time and frequency domain resource allocation method considering NC-JT-related UE capability signaling of a UE will be described.

A UE may perform a UE capability report including at least one of the following methods to inform an eNB whether NC-JT PDSCH can be received.

Method 1: The UE may inform the eNB whether it is possible to receive only a single PDSCH associated with one TCI state (or QCL information) or simultaneously receive multiple PDSCHs associated with multiple TCI states (or QCL information).

Method 2 (UE capability on NC-JT with overlapped PDSCHs): In the method 1, in a case where, with respect to only a UE capable of simultaneously receiving a plurality of PDSCHs associated with a plurality of TCI states (or QCL information), frequency resources indicated by the FD-RA values of the simultaneously received PDSCHs (or time resource or DMRS pattern which are indicated by TD-RA values) coincide with each other, the UE may inform the eNB whether it is possible to support the simultaneous reception.

Method 3 (UE capability on NC-JT with non-overlapped PDSCHs): In the method 1, in a case where, with respect to only a UE capable of simultaneously receiving a plurality of PDSCHs associated with a plurality of TCI states (or QCL information), frequency resources indicated by the FD-RA values of the simultaneously received PDSCHs (or time resource or DMRS pattern which are indicated by TD-RA values) do not coincide with each other, the UE may inform the eNB whether it is possible to support the simultaneous reception.

Method 4 (UE capability on NC-JT with partially overlapped PDSCHs): In the method 1, in a case in which, with respect to only a UE capable of simultaneously receiving a plurality of PDSCHs associated with a plurality of TCI states (or QCL information), frequency resources indicated by the FD-RA values of the simultaneously received PDSCHs (or time resource or DMRS pattern which are indicated by TD-RA values) partially coincide with each other, the UE may inform the eNB whether it is possible to support the simultaneous reception.

If the UE notifies the eNB of the support on the NC-JT based on the overlapped PDSCH according to the method 2 and notifies that the non-overlapped PDSCH or partially overlapped PDSCH-based NC-JT cannot be received according to the method 3 or 4, the eNB needs to ensure that FD-RA (or TD-RA) fields in different PDCCH DCIs in which NC-JT PDSCHs are allocated by the UE have the same value. When the UE is instructed to receive a PDSCH allocated by different FD-RA (or TD-RA) fields, the UE may not receive the entire PDSCH or may receive only one PDSCH having the highest priority among the corresponding PDSCHs.

If the UE notifies the eNB of the support on the NC-JT based on the non-overlapped PDSCH according to the method 3 and notifies that the overlapped PDSCH or partially overlapped PDSCH-based NC-JT cannot be received according to the method 2 or 4, the eNB needs to ensure that FD-RA (or TD-RA) fields in different PDCCH DCIs in which NC-JT PDSCHs are allocated by the UE have different values. If the UE is instructed to receive a PDSCH transmitted from partially overlapped frequency (or time) resources, the UE may not receive the entire PDSCH or receive only one PDSCH having the highest priority among the corresponding PDSCHs.

Figure 16:
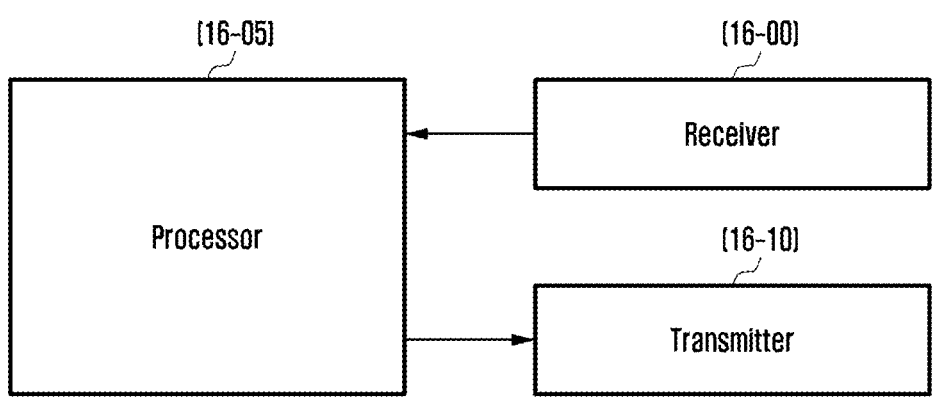
FIG. 16 illustrates a block diagram of a structure of a UE according to an embodiment of the disclosure.

FIG. 16 illustrates a block diagram of a structure of a UE according to an embodiment of the disclosure.

Referring to FIG. 16, a UE may include transceivers 16-00 and 16-10 and a processor 16-05 including a memory and a processor. According to the above-described communication method of the UE, the transceivers 16-00 and 16-10 and the processor 16-05 of the UE may operate. However, the components of the UE are not limited to the above examples. For example, the UE may include more components or fewer components than the above-described components. In addition, the transceivers 16-00 and 16-10 and the processor 16-05 may be implemented in a single chip form.

The transceivers 16-00 and 16-10 may transmit and receive signals to and from an eNB. Here, the signals may include control information and data. To this end, the transceivers 16-00 and 16-10 may include an RF transmitter for up-converting and amplifying the frequency of the transmitted signal, and an RF receiver for low-noise amplifying the received signal and down-converting the frequency thereof. However, this is only an embodiment of the transceiver 16-00 or 16-10, and the components of the transceivers 16-00 and 16-10 are not limited to the RF transmitter and the RF receiver.

In addition, the transceivers 16-00 and 16-10 may receive signals through a wireless channel, may output the received signal to the processor 16-05, and may transmit a signal output from the processor 16-05 through the wireless channel.

The processor 16-05 may store programs and data necessary for the operation of the UE. In addition, the processor 16-05 may store control information or data included in a signal obtained from the UE. The processor 16-05 may include a memory composed of a storage medium such as a ROM, a RAM, a hard disk, a CD-ROM, and a DVD or a combination of storage media. The processor 16-05 may be electrically connected to the receiver 16-00 and the transmitter 16-10, and the processor 16-05 may include at least one processor.

In addition, the processor 16-05 may control a series of processes such that the UE may operate according to the above-described embodiment. According to some embodiments, the processor 16-05 may control the component of the UE to receive a plurality of PDSCHs simultaneously by receiving a DCI composed of two layers.

Figure 17:
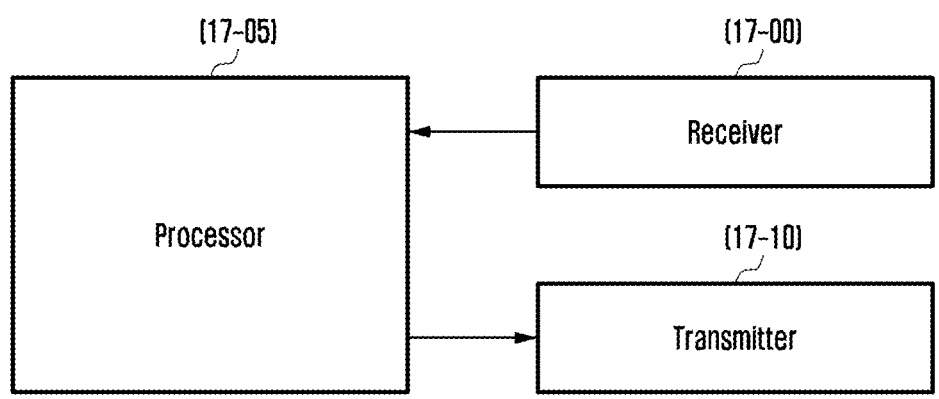
FIG. 17 illustrates a block diagram of a structure of an eNB according to an embodiment of the disclosure.

FIG. 17 illustrates a block diagram of a structure of an eNB according to an embodiment of the disclosure.

Referring to FIG. 17, an eNB may include transceivers 17-00 and 17-10 and a processor 17-05 including a memory and a processor. According to the communication method of the eNB described above, the transceivers 17-00 and 17-10 and the processor 17-05 of the eNB may operate. However, the components of the eNB are not limited to the above examples. For example, the eNB may include more components or fewer components than the aforementioned components. In addition, the transceivers 17-00 and 17-10 and the processor 17-05 may be implemented in a single chip form.

The transceivers 17-00 and 17-10 may transmit and receive signals to and from a UE. Here, the signals may include control information and data. To this end, the transceivers 17-00 and 17-10 may include an RF transmitter for up-converting and amplifying the frequency of the transmitted signal, and an RF receiver for low-noise amplifying the received signal and down-converting the frequency thereof. However, this is only an embodiment of the transceiver 17-00 or 17-10, and the components of the transceivers 17-00 and 17-10 are not limited to the RF transmitter and the RF receiver.

In addition, the transceivers 17-00 and 17-10 may receive a signal through a wireless channel, may output the signal to the processor 17-05, and may transmit a signal output from the processor 17-05 through a wireless channel.

The processor 17-05 may store programs and data necessary for the operation of the eNB. In addition, the processor 17-05 may store control information or data included in signals obtained from the eNB. The processor 17-05 may include a memory composed of a storage medium such as a ROM, a RAM, a hard disk, a CD-ROM, and a DVD or a combination of storage media. The processor 17-05 may be electrically connected to the receiver 17-00 and the transmitter 17-10, and the processor 17-05 may include at least one processor.

The processor 17-05 may control a series of processes such that the eNB can operate according to the above-described embodiment of the disclosure. According to some embodiments, the processor 17-05 may control respective components of the eNB to configure DCIs of two layers including allocation information for a plurality of PDSCHs and to transmit them.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a communication system, the method comprising:
   transmitting, to a base station, capability information of the UE for a scheme for receiving physical downlink shared channels (PDSCHs) based on a single downlink control information (DCI);
   receiving, from the base station, a physical downlink control channel (PDCCH) including a single DCI indicating two transmission configuration indicator (TCI) states and including resource allocation information for two PDSCHs; and
   receiving the two PDSCHs based on the two TCI states and the resource allocation information, the two PDSCHs being associated with one demodulation reference signal (DMRS) port group,
   wherein each of the two TCI states indicated by the single DCI is associated with each of two PDSCHs having non-overlapping time domain resource allocation, respectively, in case that the capability information indicates to support a scheme for receiving non overlapping PDSCHs in the time domain based on the single DCI.

2. The method of claim 1, wherein each of the two TCI states is associated with each of two PDSCHs having non-overlapping frequency domain resource allocation, respectively, in case that the capability information indicates to support a scheme for receiving non overlapping PDSCHs in the frequency domain based on the single DCI.

3. The method of claim 2, wherein a specific number of first physical resource blocks (PRBs) correspond to a first TCI state and remaining PRBs correspond to a second TCI state, in response to the two PDSCHs being received non-overlapping in the frequency domain.

4. The method of claim 1, wherein the two PDSCHs correspond to a same number of symbols and a same PDSCH mapping type, in response to the two PDSCHs being received non-overlapping in the time domain.

5. A method of a base station in a communication system, the method comprising:
   receiving, from a user equipment (UE), capability information of the UE for a scheme for receiving physical downlink shared channels (PDSCHs) based on a single downlink control information (DCI);
   transmitting, to the UE, a physical downlink control channel (PDCCH) including a single DCI indicating two transmission configuration indicator (TCI) states and including resource allocation information for two PDSCHs; and
   transmitting the two PDSCHs based on the two TCI states and the resource allocation information, the two PDSCHs being associated with one demodulation reference signal (DMRS) port group,
   wherein each of the two TCI states indicated by the single DCI is associated with each of two PDSCHs having non-overlapping time domain resource allocation, respectively, in case that the capability information indicates to support a scheme for receiving non overlapping PDSCHs in the time domain based on the single DCI.

6. The method of claim 5, wherein each of the two TCI states is associated with each of two PDSCHs having non-overlapping frequency domain resource allocation, respectively, in case that the capability information indicates to support a scheme for receiving non overlapping PDSCHs in the frequency domain based on the single DCI.

7. The method of claim 6, wherein a specific number of first physical resource blocks (PRBs) correspond to a first TCI state and remaining PRBs correspond to a second TCI state, in response to the two PDSCHs being transmitted non-overlapping in the frequency domain.

8. The method of claim 5, wherein the two PDSCHs correspond to a same number of symbols and a same PDSCH mapping type, in response to the two PDSCHs being transmitted non-overlapping in the time domain.

9. A user equipment (UE) in a communication system, the UE comprising:
a transceiver; and
a controller configured to:
transmit, to a base station, capability information of the UE for a scheme for receiving physical downlink shared channels (PDSCHs) based on a single downlink control information (DCI);
receive, from the base station, a physical downlink control channel (PDCCH) including a single DCI indicating two transmission configuration indicator (TCI) states and including resource allocation information for two PDSCHs; and
receive the two PDSCHs based on the two TCI states and the resource allocation information, the two PDSCHs being associated with one demodulation reference signal (DMRS) port group,
wherein each of the two TCI states indicated by the single DCI is associated with each of two PDSCHs having non-overlapping time domain resource allocation, respectively, in case that the capability information indicates to support a scheme for receiving non overlapping PDSCHs in the time domain based on the single DCI.

10. The UE of claim 9, wherein each of the two TCI states is associated with each of two PDSCHs having non-overlapping frequency domain resource allocation, respectively, in case that the capability information indicates to support a scheme for receiving non overlapping PDSCHs in the frequency domain based on the single DCI.

11. The UE of claim 10, wherein a specific number of first physical resource blocks (PRBs) correspond to a first TCI state and remaining PRBs correspond to a second TCI state, in response to the two PDSCHs being received non-overlapping in the frequency domain.

12. The UE of claim 9, wherein the two PDSCHs correspond to a same number of symbols and a same PDSCH mapping type, in response to the two PDSCHs being received non-overlapping in the time domain.

13. A base station in a communication system, the base station comprising:
a transceiver;
a controller configured to:
receive, from a user equipment (UE), capability information of the UE for a scheme for receiving physical downlink shared channels (PDSCHs) based on a single downlink control information (DCI);
transmit, to the UE, a physical downlink control channel (PDCCH) including a single DCI indicating two transmission configuration indicator (TCI) states and including resource allocation information for two PDSCHs; and
transmit the two PDSCHs based on the two TCI states and the resource allocation information, the two PDSCHs being associated with one demodulation reference signal (DMRS) port group,
wherein each of the two TCI states indicated by the single DCI is associated with each of two PDSCHs having non-overlapping time domain resource allocation, respectively, in case that the capability information indicates to support a scheme for receiving non overlapping PDSCHs in the time domain based on the single DCI.

14. The base station of claim 13, wherein each of the two TCI states is associated with each of two PDSCHs having non-overlapping frequency domain resource allocation, respectively, in case that the capability information indicates to support a scheme for receiving non overlapping PDSCHs in the frequency domain based on the single DCI.

15. The base station of claim 14, wherein a specific number of first physical resource blocks (PRBs) correspond to a first TCI state and remaining PRBs correspond to a second TCI state, in response to the two PDSCHs being transmitted non-overlapping in the frequency domain.

16. The base station of claim 13, wherein the two PDSCHs correspond to a same number of symbols and a same PDSCH mapping type, in response to the two PDSCHs being transmitted non-overlapping in the time domain.

* * * * *